(12) United States Patent
Jeong et al.

(10) Patent No.: US 10,893,092 B2
(45) Date of Patent: Jan. 12, 2021

(54) ELECTRONIC DEVICE FOR SHARING APPLICATION AND CONTROL METHOD THEREOF

(71) Applicant: Samsung Electronics Co., Ltd., Suwon-si (KR)

(72) Inventors: Sun-Young Jeong, Suwon-si (KR); Kang-Tae Kim, Seongnam-si (KR); Chul-Joo Kim, Suwon-si (KR); Kun-Woo Baek, Suwon-si (KR); Hee-Ran Youn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 949 days.

(21) Appl. No.: 14/517,092

(22) Filed: Oct. 17, 2014

(65) Prior Publication Data

US 2015/0120817 A1 Apr. 30, 2015

(30) Foreign Application Priority Data

Oct. 30, 2013 (KR) ........................ 10-2013-0130328

(51) Int. Cl.
*H04L 29/08* (2006.01)
*H04L 29/06* (2006.01)
(Continued)

(52) U.S. Cl.
CPC ............ *H04L 67/10* (2013.01); *G06F 3/1423* (2013.01); *G06F 3/1454* (2013.01); *G06F 9/452* (2018.02); *H04L 67/42* (2013.01); *G09G 5/14* (2013.01); *G09G 2340/0407* (2013.01); *G09G 2354/00* (2013.01); *G09G 2358/00* (2013.01); *G09G 2370/04* (2013.01); *G09G 2370/16* (2013.01)

(58) Field of Classification Search
CPC .... G06F 3/1423; G06F 3/1454; G06F 9/4445; G06F 9/452; G06F 9/451; G06F 13/38; G06F 13/14; G06F 9/445; G06F 3/048; H04L 67/10; H04L 67/42; G09G 2370/16; G09G 2358/00; G09G 2370/04; G09G 2340/0407; G09G 2354/00; G09G 5/14
USPC ........................................................ 709/203
See application file for complete search history.

(56) References Cited

U.S. PATENT DOCUMENTS 6,686,852 B1   2/2004  Guo
8,271,907 B2   9/2012  Kim et al.
(Continued)

FOREIGN PATENT DOCUMENTS

CN   1344989 A   4/2002
CN   1458576 A   11/2003
(Continued)

OTHER PUBLICATIONS

Examination report dated Sep. 28, 2018, issued in the European application No. 14 190 689.1.

*Primary Examiner* — Thomas J Dailey
*Assistant Examiner* — Lam H Duong
(74) *Attorney, Agent, or Firm* — Jefferson IP Law, LLP

(57) ABSTRACT

A control method of a host electronic device communicating with a client electronic device is provided. The control method includes forming a connection with the client electronic device, determining an application to be shared with the client electronic device, generating shared data for the application to be shared, and transmitting the shared data to the client electronic device.

19 Claims, 23 Drawing Sheets

(51) Int. Cl.
*G06F 3/14* (2006.01)
*G06F 9/451* (2018.01)
*G09G 5/14* (2006.01)

(56) References Cited

U.S. PATENT DOCUMENTS

| | | | |
|---|---|---|---|
| 2003/0076362 | A1 | 4/2003 | Terada |
| 2004/0056903 | A1 | 3/2004 | Sakai |
| 2005/0235220 | A1 | 10/2005 | Duperrouzel et al. |
| 2007/0192726 | A1 | 8/2007 | Kim et al. |
| 2008/0172609 | A1 | 7/2008 | Rytivaara |
| 2008/0214239 | A1 | 9/2008 | Hashimoto et al. |
| 2008/0320396 | A1 | 12/2008 | Mizrachi et al. |
| 2009/0307631 | A1 | 12/2009 | Kim et al. |
| 2009/0322690 | A1 | 12/2009 | Hiltunen et al. |
| 2010/0062811 | A1 | 3/2010 | Park et al. |
| 2010/0088634 | A1 | 4/2010 | Tsuruta et al. |
| 2010/0138780 | A1 | 6/2010 | Marano et al. |
| 2010/0169791 | A1 | 7/2010 | Pering et al. |
| 2010/0214278 | A1 | 8/2010 | Miura |
| 2010/0248788 | A1 | 9/2010 | Yook et al. |
| 2010/0262673 | A1* | 10/2010 | Chang .................. G06F 3/1454 709/217 |
| 2010/0312817 | A1 | 12/2010 | Steakley |
| 2011/0066971 | A1* | 3/2011 | Forutanpour ........... G06F 9/451 715/788 |
| 2011/0106954 | A1 | 5/2011 | Chatterjee et al. |
| 2012/0054640 | A1 | 3/2012 | Nancke-Krogh |
| 2012/0159334 | A1 | 6/2012 | Messerly et al. |
| 2012/0159472 | A1* | 6/2012 | Hong ..................... H04W 4/21 717/178 |
| 2012/0176322 | A1 | 7/2012 | Karmi et al. |
| 2012/0303476 | A1 | 11/2012 | Krzyzanowski et al. |
| 2013/0219303 | A1 | 8/2013 | Eriksson et al. |
| 2013/0278484 | A1* | 10/2013 | Hwang ................. G06F 3/1423 345/2.3 |
| 2013/0283193 | A1* | 10/2013 | Griffin .................. G06F 3/1446 715/761 |
| 2014/0040803 | A1* | 2/2014 | Briand .................. G06F 3/0486 715/769 |
| 2014/0089385 | A1* | 3/2014 | Thayer ............... H04N 21/4402 709/203 |
| 2014/0170978 | A1* | 6/2014 | Wolman .................... G06F 9/54 455/41.2 |
| 2014/0245194 | A1* | 8/2014 | Wright .................... G06F 9/452 715/761 |
| 2014/0351344 | A1 | 11/2014 | Wu et al. |
| 2015/0200998 | A1* | 7/2015 | Gu .......................... H04L 67/08 709/208 |

FOREIGN PATENT DOCUMENTS

| | | |
|---|---|---|
| CN | 101352057 A | 1/2009 |
| CN | 102 638 586 A | 8/2012 |
| JP | 10-260784 A | 9/1998 |
| JP | 2004-046796 A | 2/2004 |
| JP | 2006-073015 A | 3/2006 |
| JP | 2006-115213 A | 4/2006 |
| JP | 2008-117181 A | 5/2008 |
| JP | 2008-134348 A | 6/2008 |
| KR | 10-0478920 B1 | 3/2005 |
| KR | 10-2006-0039503 A | 5/2006 |
| KR | 10-0650257 B1 | 11/2006 |
| KR | 10-0652626 B1 | 12/2006 |
| KR | 10-0700171 B1 | 3/2007 |
| KR | 10-2008-0018396 A | 2/2008 |
| KR | 10-2009-0016044 A | 2/2009 |
| KR | 10-0900295 B1 | 5/2009 |
| KR | 10-2010-0030968 A | 3/2010 |
| KR | 10-2010-0053823 A | 5/2010 |
| KR | 10-2010-0080394 A | 7/2010 |
| WO | 2008/090902 A1 | 7/2008 |
| WO | 2009/017175 A1 | 2/2009 |
| WO | 2009/028892 A2 | 3/2009 |

* cited by examiner

ELECTRONIC DEVICE FOR SHARING APPLICATION AND CONTROL METHOD THEREOF

CROSS-REFERENCE TO RELATED APPLICATION(S)

This application claims the benefit under 35 U.S.C. § 119(a) of a Korean patent application filed on Oct. 30, 2013 in the Korean Intellectual Property Office and assigned Serial number 10-2013-0130328, the entire disclosure of which is hereby incorporated by reference.

TECHNICAL FIELD

The present disclosure relates to an electronic device for sharing an application and a control method thereof. More particularly, the present disclosure relates to an electronic device for performing communication in a predetermined scheme to share an application and a control method thereof.

BACKGROUND

A desktop computer has at least one display device (for example, a monitor). A mobile device (for example, a mobile phone, a smart phone, or a tablet Personal Computer (PC)) using a touch screen has one display device.

A user of the desktop computer may divide a screen of the display device according to a working environment (for example, horizontally or vertically divide the screen while displaying a plurality of windows) and may use the divided screens. When a web browser is executed, the user can move in an upward or downward direction of the web page by using a page up button or a page down button arranged in a keyboard. When the user uses a mouse instead of the keyboard, the user can move in the upward or downward direction of the web page by selecting a scroll bar located on a side part of the web page by using a cursor of the mouse. Further, the user can move in the upward or downward direction of the web page by selecting a top button displayed as text or as an icon located at a bottom part of the web page.

The mobile device has a smaller size of the displayed screen in comparison with the desktop computer and a corresponding size limitation in regard to generating an input. The user may also have difficulty in dividing a display screen of the mobile device and then using the mobile device.

Further, the mobile device can execute various applications, such as basic applications produced by a manufacturer of the mobile device, and which are installed in the mobile device, and additional applications which may be downloaded from an application selling site through the Internet. The additional applications may be developed by ordinary users and may be registered in the application selling site. Accordingly, anyone can freely sell applications developed by himself or herself to users of the mobile device through the application selling site. As a result, mobile devices are currently provided with tens of thousands to hundreds of thousands of applications free of charge or at costs which may vary among different products.

A various applications which stimulate consumers' curiosity and satisfy consumers' demands are provided in mobile devices, the mobile device is provided to have a portable size, and thus it has a limitation according to its size and a User Interface (UI) thereof. Accordingly, users may feel inconvenienced when executing a plurality of applications in the mobile device. As described above, this is because the display means of such a smart phone or a tablet Personal Computer (PC) is small, and thus there exists difficulty in identifying the plurality of applications. In order to overcome the limitations of the display, it is required to develop a technology to share an application with another electronic device. The related art provides a mirroring service in which an entire screen displayed on a display of one electronic device is shared with another electronic device. However, in the mirroring service of the related art, the entire screen of the display is shared with another electronic device so that a user has no choice but to share all parts of the screen, including a part which the user may not desire to share, with the other electronic device. Further, in the mirroring service, the other electronic device simply receives and displays only a screen, and cannot input any additional commands. As a result, the convenience felt by the user of the other electronic device deteriorates.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

The present disclosure has been made to address the above problems and in response to a technology development request. Accordingly, an aspect of the present disclosure is to provide an electronic device which can share an application with another electronic device and a control method thereof.

In accordance with an aspect of the present disclosure, a control method of a host electronic device communicating with a client electronic device is provided. The control method includes forming a connection with the client electronic device, determining an application to be shared with the client electronic device, generating shared data for the application to be shared, and transmitting the shared data to the client electronic device.

In accordance with another aspect of the present disclosure, a host electronic device communicating with a client electronic device is provided. The host electronic device includes a communication unit configured to form a connection with the client electronic device, a controller configured to determine an application to be shared with the client electronic device, to generate shared data for the application to be shared, and to control the communication unit to transmit the shared data to the client electronic device, and a screen configured to display an execution screen of the application to be shared.

In accordance with another aspect of the present disclosure, a control method of a client electronic device sharing an application with a host electronic device is provided. The control method includes forming a connection with the host electronic device, receiving shared data for an application to be shared with the host electronic device from the host electronic device, and outputting the shared data.

In accordance with another aspect of the present disclosure, an electronic device sharing an application with a host electronic device is provided. The electronic device includes a communication unit configured to form a connection with the host electronic device, and to receive shared data for an application to be shared with the host electronic device from the host electronic device, and a screen configured to output the shared data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
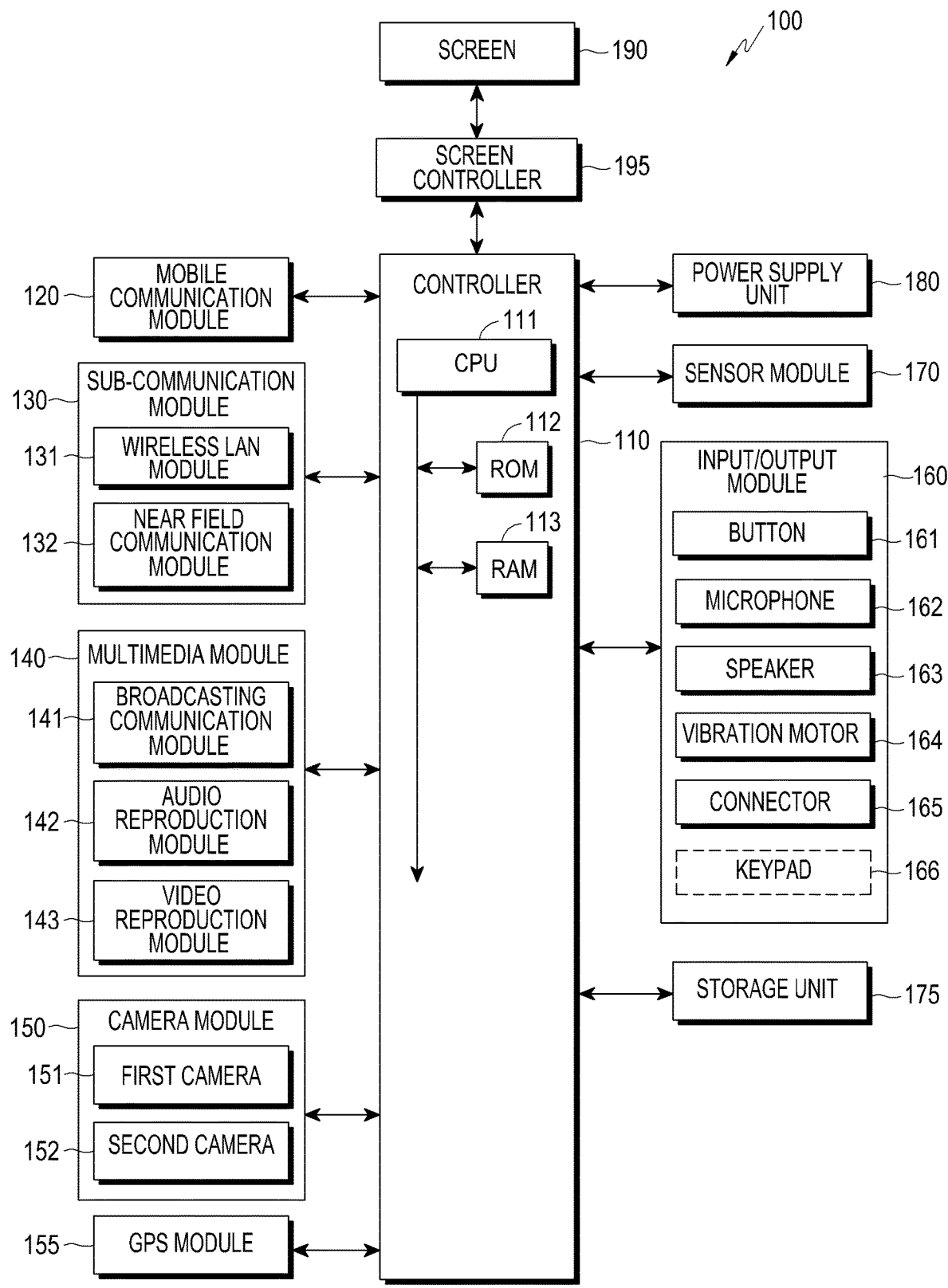
FIG. 1 is a block diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalent.

It is to be understood that the singular forms "a," "an," and "the" include plural referents unless the context clearly dictates otherwise. Thus, for example, reference to "a component surface" includes reference to one or more of such surfaces.

While terms including ordinal numbers, such as "first" and "second," etc., may be used to describe various components, such components are not limited by the above terms. The terms are used merely for the purpose to distinguish an element from the other elements. For example, without departing from the scope of the present disclosure, a first structural element may be named a second structural named. Similarly, the second structural element also may be named the first structural element. The terms "and/or" includes combinations of a plurality of related items or a certain item among the plurality of related items.

The terms used in this application are for the purpose of describing various embodiments only and are not intended to be limiting of the disclosure. As used herein, the singular forms are intended to include the plural forms as well, unless the context clearly indicates otherwise. In the description, it should be understood that the terms "include" or "have" indicate existences of a feature, a number, a step, an operation, a structural element, parts, or a combination thereof, and do not exclude the existences or probability of addition of one or more another features, numeral, steps, operations, structural elements, parts, or combinations thereof.

Unless defined differently, all terms used herein, which include technical terminologies or scientific terminologies, have the same meaning as a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning.

FIG. 1 is a block diagram illustrating a configuration of an electronic device according to an embodiment of the present disclosure.

Referring to FIG. 1, the electronic device 100 may be connected to an external device (not shown) by using an external device connector such as a sub-communication module 130, a connector 165, and an earphone connecting jack 167 (not shown). The "external device" may include various devices attached to or detached from the electronic device 100 through a cable, such as an earphone, an external speaker, a Universal Serial Bus (USB) memory, a charger, a cradle, a docking station, a Digital Multimedia Broadcasting (DMB) antenna, a mobile payment related device, a health management device (e.g., a blood sugar tester, or the like), a game machine, a car navigation device, and the like. Further, the "external device" may include one of a short-range communication unit, such as a Bluetooth communication unit, a Near Field Communication (NFC) unit and a Wi-Fi direct communication device, and a wireless Access Point (AP), which are wirelessly connected to the electronic device 100 via short-range communication. In addition, the external device may include another device, a portable phone, a smart phone, a tablet Personal Computer (PC), a desktop PC, and a server.

The electronic device 100 may be a mobile electronic device as a representative example, but may be a tablet PC, a desktop PC, a smart TV, a notebook computer, an MP3 player and the like.

Referring to FIG. 1, the electronic device 100 may include a screen 190 and a screen controller 195, and may further include at least one of a controller 110, a communication unit including a mobile communication module 120 or the sub-communication module 130, a multimedia module 140, a camera module 150, a Global Positioning System (GPS) module 155, an input/output module 160, a sensor module 170, a storage unit 175, and a power supply unit 180. The sub-communication module 130 may include at least one of a wireless Local Area Network (LAN) module 131 and an -NFC module 132, and the multimedia module 140 may include at least one of a broadcasting communication module 141, an audio reproduction module 142, and a video reproduction module 143. The camera module 150 may include at least one of a first camera 151 and a second camera 152. The input/output module 160 may include at least one of a button 161, a microphone 162, a speaker 163, a vibration motor 164, a connector 165, a keypad 166, and an earphone connecting jack 167.

The controller 110 may include a Central Processing Unit (CPU) 111, a Read Only Memory (ROM) 112 storing a control program for controlling the electronic device 100, and a Random Access Memory (RAM) 113 used as a storage area for storing a signal or data input from the outside of the electronic device 100 or for work performed in the electronic device 100. The CPU 111 may include a single core CPU, a dual core CPU, a triple core CPU, or a quadruple core CPU. The CPU 111, the ROM 112 and the RAM 113 may be connected with one another through internal buses.

The controller 110 may control at least one of the mobile communication module 120, the sub-communication module 130, the multimedia module 140, the camera module 150, the GPS module 155, the input/output module 160, the sensor module 170, the storage unit 175, the power supply unit 180, the screen 190, and the screen controller 195.

The mobile communication module 120 enables the electronic device 100 to be connected with the external device through mobile communication by using at least one antenna or a plurality of antennas (not shown) under a control of the controller 110. The mobile communication module 120 may transmit/receive a wireless signal for a voice call, a video call, a Short Message Service (SMS), or a Multimedia Message Service (MMS) to/from a mobile phone (not shown), a smart phone (not shown), a tablet PC, or another device (not shown) having a phone number input into the electronic device 100.

The sub-communication module 130 may include at least one of the wireless LAN module 131 and the short-range communication module 132. For example, the sub-communication module 130 may include only the wireless LAN module 131, only the short-range communication module 132, or both the wireless LAN module 131 and the short-range communication module 132.

The wireless LAN module 131 may be connected to the Internet at a location in which the wireless Access Point (AP) is installed, under a control of the controller 110. The wireless LAN module 131 supports a wireless LAN standard (IEEE802.11x) of the Institute of Electrical and Electronics Engineers (IEEE). The short-range communication module 132 may wirelessly perform short distance communication between the electronic device 100 and an image forming apparatus (not shown) under a control of the controller 110. A short-range communication scheme may include a Bluetooth communication scheme, an Infrared Data Association (IrDA) communication scheme, a WiFi-Direct communication scheme, a Near Field Communication (NFC) scheme and the like.

The electronic device 100 may include at least one of the mobile communication module 120, the wireless LAN module 131, and the short-range communication module 132 according to a performance of the electronic device 100. For example, the electronic device 100 may include a combination of the mobile communication module 120, the wireless LAN module 131, and the short-range communication module 132 according to a performance of the electronic device 100.

The multimedia module 140 may include the broadcasting communication module 141, the audio reproduction module 142 or the video reproduction module 143. The broadcasting communication module 141 can receive a broadcasting signal, e.g., a TV broadcasting signal, a radio broadcasting signal, or a data broadcasting signal, and broadcasting supplement information, e.g., Electric Program Guide (EPG) or Electric Service Guide (ESG), output from a broadcasting station through a broadcasting and communication antenna (not shown) under a control of the controller 110. The audio reproduction module 142 may reproduce a stored or received digital audio file, e.g., a file having a file extension of mp3, wma, ogg, or way, under a control of the controller 110. The video reproduction module 143 may reproduce a stored or received digital video file, e.g., a file of which the file extension is mpeg, mpg, mp4, avi, mov, or mkv, under a control of the control unit 110. The video reproduction module 143 may reproduce a digital audio file.

In various embodiments, the multimedia module 140 may include only the audio reproduction module 142 and the video reproduction module 143 except for the broadcasting communication module 141. Although FIG. 1 illustrates that the audio reproduction module 142 and the video reproduction module 143 are included in the multimedia module 140, the audio reproduction module 142 and the video reproduction module 143 of the multimedia module 140 may be included in the controller 110 according to another embodiment of the present disclosure.

The camera module 150 may include at least one of the first camera 151 and the second camera 152 each of which photographs a still image or a video under a control of the control unit 110. Further, the first camera 151 or the second camera 152 may include an auxiliary light source (for example, a flash (not shown)) providing light required for the photographing. The first camera 151 may be disposed on a front surface of the electronic device 100 and the second camera 152 may be disposed on a rear surface of the electronic device 100. Alternatively, the first and second cameras 151 and 152 may be adjacently arranged (for example, an interval between the first camera 151 and the second camera 152 is larger than 1 cm and smaller than 8 cm), so as to photograph a three-dimensional still image or a three-dimensional video.

The GPS module 155 may receive radio waves from a plurality of GPS satellites (not shown) in Earth's orbit and calculate a position of the electronic device 100 by using Time of Arrival from the GPS satellites to the electronic device 100.

The input/output module 160 may include at least one of the button 161, the microphone 162, the speaker 163, the vibration device 164, the connector 165, and the keypad 166.

The button 161 may be formed on a front surface, a side surface, or a rear surface of a housing of the electronic device 100, and may include at least one of a power/lock button, a volume button, a menu button, a home button, a back button, and a search button.

The microphone 162 receives a voice or a sound to generate an electrical signal according to a control of the controller 110.

The speaker 163 may output sounds corresponding to various signals (for example, a wireless signal, a broadcasting signal, a digital audio file, a digital video file, photographing or the like) of the mobile communication module 120, the sub-communication module 130, the multimedia module 140, or the camera module 150 to the outside of the electronic device 100 under a control of the controller 110. The speaker 163 may output a sound (for example, button tone corresponding to phone communication, ringing tone, and a voice of another user) corresponding to a function performed by the electronic device 100. One or more speakers 163 may be formed on a proper position or positions of the housing of the electronic device 100.

The vibration motor 164 may convert an electric signal to a mechanical vibration under a control of the control unit 110. For example, when the electronic device 100 in a vibration mode receives a voice call from another device (not shown), a vibration motor is operated. One or more vibration motors 164 may be formed within the housing of the electronic device 100. The vibration motor 164 may operate in response to a touch action of the user made on the screen 190 or successive movements of the touch on the screen 190.

The connector 165 may be used as an interface for connecting the electronic device 100 with an external device (not shown) or a power source (not shown). The electronic device 100 may transmit or receive data stored in the storage unit 175 of the electronic device 100 to or from an external device (not shown) through a wired cable connected to the connector 165 according to a control of the controller 110. At this time, the external device may be a docking station, and the data may be an input signal transmitted from an external input device, for example, a mouse, a keyboard or the like. Further, the electronic device 100 may receive power from the power source (not shown) through the wired cable connected to the connector 165 or charge a battery (not shown) by using the power source.

The keypad 166 may receive a key input from the user for the control of the electronic device 100. The keypad 166 may include a physical keypad (not shown) formed in the electronic device 100 or a virtual keypad (not shown) displayed on the screen 190. The physical keypad (not shown) formed in the electronic device 100 may be excluded according to the performance or a structure of the electronic device 100.

An earphone (not shown) may be inserted into the earphone connecting jack 167 to be connected with the electronic device 100.

The sensor module 170 may include at least one sensor for detecting a status of the electronic device 100. For example, the sensor module 170 may include a proximity sensor for detecting proximity of a user to the electronic device 100, and an illumination sensor for detecting the amount of light near the electronic device 100. Further, the sensor module 170 may include a gyro sensor. The gyro sensor may detect the operation of the electronic device 100 (for example, rotation of the electronic device 100, or acceleration or vibration applied to the electronic device 100), may detect a point of the compass using the magnetic field on Earth, or may detect a gravity acting direction. Further, the sensor module 170 may include an altimeter for measuring an atmospheric pressure to detect an altitude. As described above, at least one sensor included in the sensor module 170 may detect the status of the electronic device 100 according to each function thereof, generate a signal corresponding to the detection, and transmit the generated signal to the controller 110. The sensors of the sensor module 170 may be added or omitted according to the performance of the electronic device 100.

The storage unit 175 may store an input/output signal or data corresponding to the operation of the communication module 120, the sub-communication module 130, the multimedia module 140, the camera module 150, the GPS module 155, the input/output module 160, the sensor module 170, or the screen 190. The storage unit 175 may store a control program and applications for controlling the electronic device 100 or the controller 110.

The term "storage unit" includes the storage unit 175, the ROM 112 or the RAM 113 within the controller 110, or a memory card (not shown) (for example, an SD card or a memory stick) mounted to the electronic device 100. Further, the storage unit may include a nonvolatile memory, a volatile memory, a Hard Disk Drive (HDD), or a Solid State Drive (SSD).

The power supplier 180 may supply power to one or more batteries (not shown) disposed on the housing of the electronic device 100 according to a control of the controller 110 and the one or more batteries (not shown) may supply power to the electronic device 100. Further, the power supplier 180 may supply power input from an external power source (not shown) through the wired cable connected to the connector 165 to the electronic device 100. In various embodiments, the power supplier 180 may supply power wirelessly input from the external electric power source through a wireless charging technology to the electronic device 100.

The screen 190 may be implemented by a touch screen which can detect a touch as an input of the user. The screen 190 may provide the user with a UI corresponding to various services (for example, a voice call, data transmission, broadcasting, and photographing). The screen 190 may transmit an analog signal corresponding to at least one touch input into the user interface, to the screen controller 195. The screen 190 may receive at least one touch through a body of the user (for example, fingers including a thumb) or a touchable input means (for example, a stylus pen or the like). Further, the screen 190 may receive successive movements of one touch among the at least one touch. The screen 190 may transmit an analog signal corresponding to the successive movements of the input touch to the screen controller 195.

In the present disclosure, the touch is not limited to a contact between the screen 190 and the user's body or to the touchable input means, and may include a non-contact touch event. A distance of the non-contact touch event, which can be detected by the screen 190, may be changed according to the performance or the structure of the electronic device 100.

The screen 190 may be implemented in various screen types, for example, a resistive type, a capacitive type, an Electronic Magnetic Resonance (EMR) type (hereinafter, referred to as an EMR type), an infrared type, an acoustic wave type, or a combination thereof.

The screen controller 195 converts an analog signal received by the screen 190 to a digital signal (for example, X and Y coordinates) and transmits the converted digital signal to the controller 110. The controller 110 may control the screen 190 by using the digital signal received from the screen controller 195. For example, the controller 110 may allow a short-cut icon (not shown) displayed on the screen 190 to be selected or execute an operation corresponding to the short-cut icon (not shown) in response to the touch. The screen controller 195 may be included in the controller 110 in various embodiments.

Figure 2:
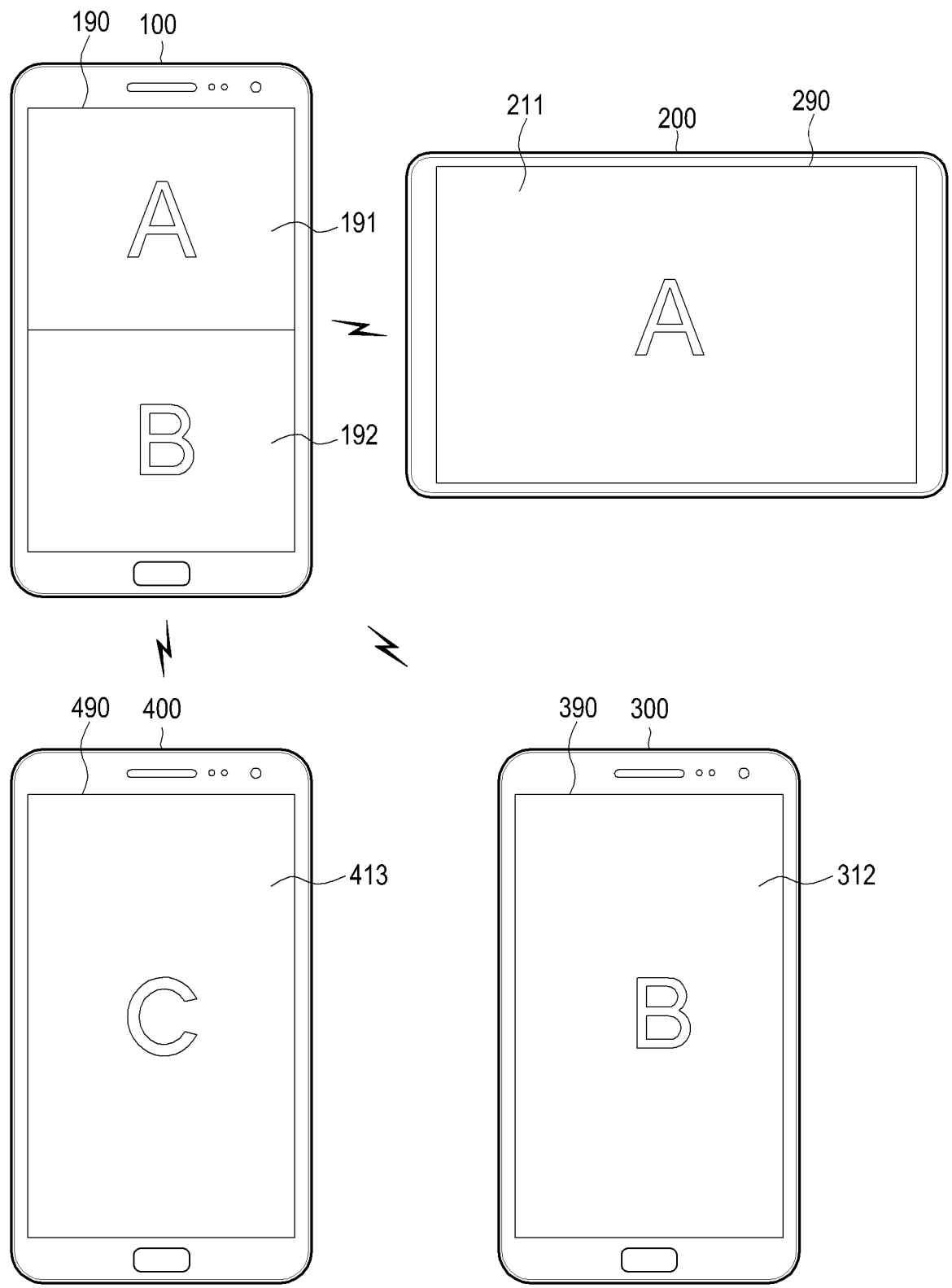
FIG. 2 is an illustration of electronic devices sharing at least one application according to an embodiment of the present disclosure.

FIG. 2 is an illustration of electronic devices sharing at least one application according to an embodiment of the present disclosure.

Referring to FIG. 2, a host electronic device, that is, a first electronic device 100 which shares at least one application with each of client electronic devices, such as a second electronic device 200, a third electronic device 300, and a fourth electronic device 400 will be described herein. The first electronic device 100 may share at least one application which is being executed in the first electronic device 100 with the second electronic device 200, the third electronic device 300, and the fourth electronic device 400. In an embodiment, the first electronic device 100, which executes the application and shares the executed application or a screen displaying the executed application with other electronic devices, is referred to as a "host electronic device". Further, the second to fourth electronic devices 200, 300, and 400, which receive data related to the application to be shared, for example, the screen displaying the executed application from the host electronic device and output the received data, are referred to as "client electronic devices".

The first electronic device 100 may display a first application execution screen 191 executing a first application A and a second application execution screen 192 executing a second application B. The first electronic device 100 may display the first application execution screen 191 and the second application execution screen 192 on the screen 190 in a split mode. That is, the first electronic device 100 may display the first application execution screen 191 and the second application execution screen 192 on different separated regions of the screen 190 as illustrated in FIG. 2.

According to another embodiment, the first electronic device 100 may display the first application execution screen 191 and the second application execution screen 192 on the screen 190 in a free style mode. The first electronic device 100 may assign a display priority to each of the first application execution screen 191 and the second application execution screen 192, and the first application execution screen 191 and the second application execution screen 192 may be overlappingly displayed on the screen 190 based on the assigned priority. As described above, the host electronic device, for example, the first electronic device 100 may output the screens executing a plurality of applications to the screen 190 in the split mode or the free style mode and also display the screens on the screen 190 in various ways.

Referring to FIG. 2, the first electronic device 100 displays the first application execution screen 191 and the second application execution screen 192 in the split mode. A plurality of objects related to the applications A and B may be displayed on the first application execution screen 191 and the second application execution screen 192. The objects which can be displayed on the application execution screens may include various forms, such as text, a figure, an icon, a button, a checkbox, a picture, a video, a web, a map and the like. When a user touches an object displayed on the screen, the controller 110 of the first electronic device 100 may control an application to execute a function predetermined for the object or an event corresponding to the object. Further, the object may be called a view according to an operating system.

In the embodiment of FIG. 2, it is assumed that the first electronic device 100 further executes a third application C. That is, it is assumed that the first electronic device 100 executes the first application A, the second application B, and the third application C. Further, it is assumed that the first electronic device 100 of FIG. 2 does not display the third application C on the screen 190. As described above, the first electronic device 100 can perform a calculation by the third application C while executing the third application C, but may not display a result of the execution of the third application C on the screen 190.

It is assumed that the first electronic device 100 shares the first application A with the second electronic device 200. Further, it is assumed that the first electronic device 100 shares the second application B with the third electronic device 300. In addition, it is assumed that the first electronic device 100 shares the third application C with the fourth electronic device 400. Accordingly, the first electronic device 100 may form a connection with each of the second electronic device 200, the third electronic device 300 and the fourth electronic device 400. The first electronic device 100 may transmit first shared data, second shared data and third shared data to the second electronic device 200, the third electronic device 300, and the fourth electronic device 400, respectively. At this time, the first shared data may include at least one of video data, graphic data, audio data, and display information as an output result of the first application A. The second shared data may be an output result of the second application B and the third shared data may be an output result of the third application C.

The second electronic device 200 may output the first shared data received from the first electronic device 100 on the screen 290. For example, the second electronic device 200 may display a first application execution screen 211 on a screen 290. The third electronic device 300 may output the received second shared data on a screen 390. For example, the third electronic device 300 may display a second application execution screen 312 on a screen 390. The fourth electronic device 400 may output the third shared data received from the first electronic device 100 on a screen 490. For example, the fourth electronic device 400 may display a third application execution screen 413 on the screen 490.

Although FIG. 2 illustrates that the client electronic devices (for example, the second electronic device 200, the third electronic device 300 and the fourth electronic device 400) simply display predetermined data on their displays, it is only an example. In various embodiments, the client electronic device (for example, the second electronic device 200, the third electronic device 300 or the fourth electronic device 400) may receive at least one of display data and voice or vibration multimedia output related data from the host electronic device (for example, the first electronic device 100), and accordingly may display predetermined data on displays (for example, screens) and may also provide various voice or vibration multimedia outputs.

The client electronic devices, that is, the second electronic device 200 to the fourth electronic device 400, may output the shared data received from the host electronic device without any change or after changing the shared data in accordance with characteristics of the devices. For example, the second electronic device 200 may display the first application execution screen 211 at the same aspect ratio as that of the first application execution screen 191 displayed by the first electronic device 100. The third electronic device 300 receives the second application execution screen 192 displayed by the first electronic device 100 and may display the second application execution screen 312 of which an aspect ratio has been converted in accordance with the third electronic device 300. Alternatively, in another embodiment, the shared data may be transmitted without any change or after a conversion according to each of the client electronic devices (for example, the second electronic device 200, the third electronic device 300 and the fourth electronic device 400) connected to the first electronic device 100 corresponding to the host electronic device. For example, the first electronic device 100 may transmit the first application execution screen 211 to the second electronic device 200, the second application execution screen 312 to the third electronic device 300 and the third application execution screen 413 to the fourth electronic device 400.

Referring to FIG. 2, the second electronic device 200 receives the first shared data corresponding to the first application execution screen 191 from the first electronic device 100 and may display the first application execution screen 211 on the screen 290. The third electronic device 300 receives the second shared data corresponding to the second application execution screen 192 from the first electronic device 100 and may display the second application execution screen 312 on the screen 390. The fourth electronic device 400 receives the third shared data corresponding to the third application execution screen (not shown) from the first electronic device 100 and may display the third application execution screen 413 on the screen 490.

In various embodiments, the host electronic device determines the client electronic device as a connected output device, and thus may be designed to not influence a conventional application execution mechanism. The client electronic device may recognize the host electronic device as an external device or a cloud server.

Figure 3:
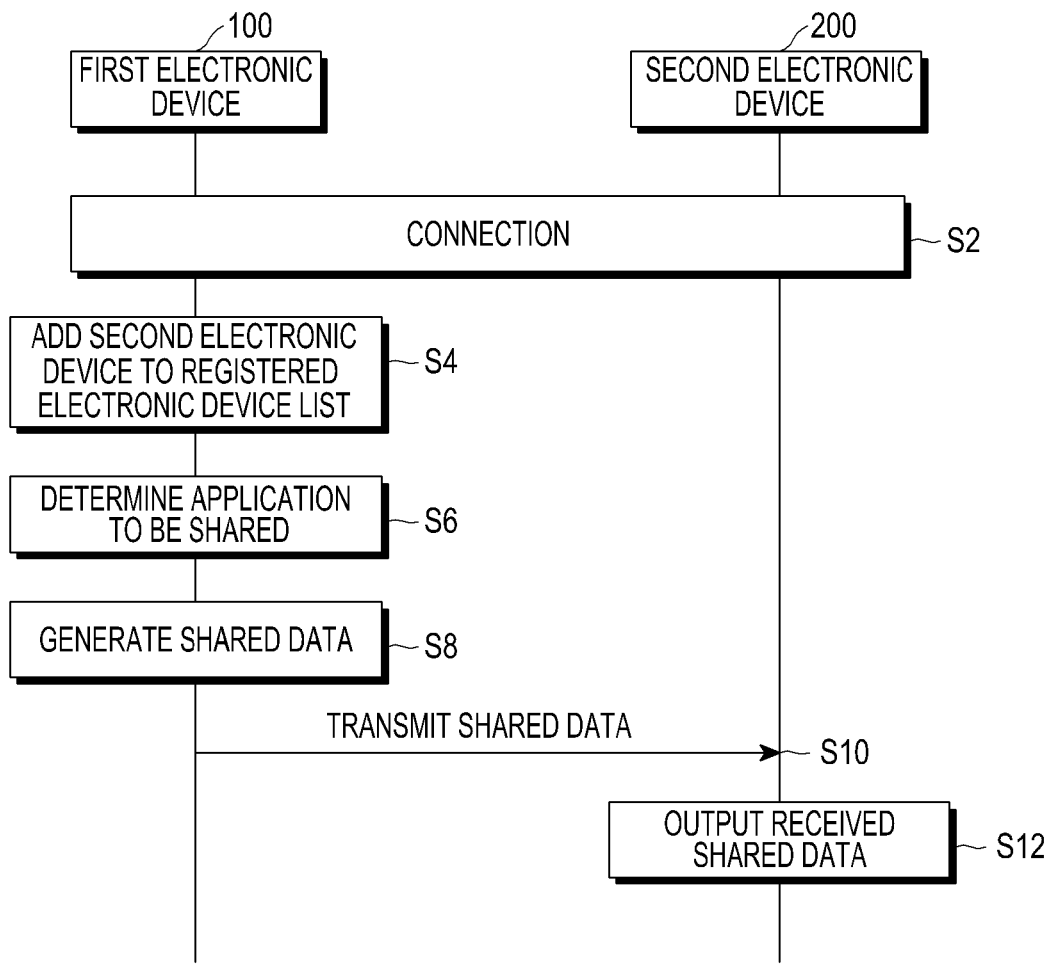
FIG. 3 is a flowchart illustrating operations of electronic devices which share at least one application according to an embodiment of the present disclosure.

FIG. 3 is a flowchart illustrating operations of electronic devices which share at least one application according to an embodiment of the present disclosure.

Referring to FIG. 3, the first electronic device 100 forms a connection with the second electronic device 200 in S2. When the connection with the second electronic device 200 is formed, the first electronic device 100 adds the second electronic device 200 to a registered electronic device list in operation S4. In order to add the second electronic device 200 to the registered electronic device list in operation S4, the first electronic device 100 may receive second electronic device information from the second electronic device 200 and store the received second electronic device information. The second electronic device information may include at least one of an identification, display size information, resolution information, display information, Dots Per Inch (DPI), and voice or vibration multimedia output related information of the second electronic device 200. In various embodiments, the second electronic device information may be encrypted and thus improve security.

The first electronic device 100 determines an application to be shared with the second electronic device 200 in operation S6. For example, the first electronic device 100 may determine an application to be shared with the second electronic device 200 based on a user input. The first electronic device 100 may display a list of applications which can be shared with the second electronic device 200 on the screen 190, and the user may make a user input for designating at least one application included in the application list displayed on the screen 190. The first electronic device 100 may determine the application to be shared based on the user input. Such a method of determining the application to be shared based on the user input may be performed through a menu or according to a system function, such as an environment setting. When the application to be shared is determined through the menu, the user may select the application to be shared according to a sharing sequence or an assigned identification. According to another embodiment, the first electronic device 100 may display a function key for designating the application to be shared on the screen 190 and determine the application to be shared based on a designation of the displayed function key by the user.

According to another embodiment, the first electronic device 100 may store the application to be shared in a default form. For example, when the first electronic device 100 executes the application to be shared set by default, the first electronic device 100 may share the application with the second electronic device 200. The first electronic device 100 may set the corresponding application as an application to be shared by default in a file configuring attributes of the application. For example, in a case of an Android platform, the first electronic device 100 may set a manifest file as an application to be shared by default. A framework may make a control such that the application to be shared set by default in accordance with the application attributes is shared with another electronic device.

When the application to be shared is determined, the first electronic device 100 generates shared data in operation S8. The shared data may be an output of the application to be shared. The first electronic device 100 may generate shared data including voice or vibration data output from the application to be shared as well as display data of the application to be shared. In various embodiments, the first electronic device 100 may extract and generate only data output from the application to be shared as the shared data instead of all data output from the first electronic device 100.

When the shared data is generated, the first electronic device 100 transmits the generated shared data to the second electronic device 200 in operation S10. The first electronic device 100 may transmit the shared data to the second electronic device 200 based on a short distance communication scheme, such as Bluetooth, Bluetooth low energy, IrDA, WiFi-Direct communication, NFC or the like.

According to an embodiment, the client electronic devices (for example, the second electronic device 200 to the fourth electronic device 400) may use an accessory supporting WiFi-Direct. For example, when NFC is used, based on bumping detected by an NFC reader, automatic sharing may be performed in the detection. The host electronic device (for example, the first electronic device 100) may use the client electronic devices and a network protocol or a mechanism, such as streaming or Virtual Private Network (VPN).

In various embodiments, the first electronic device 100 may transmit the shared data to a relay server (not shown)

based on wireless data transmission and the relay server (not shown) may relay the shared data received from the first electronic device 100 to the second electronic device 200. Accordingly, the first electronic device 100 may share an application with the second electronic device 200 at a distance exceeding a range within which the short distance communication is possible.

According to another embodiment, the first electronic device 100 may transmit the share data to the second electronic device 200 based on a wired communication scheme. For example, the first electronic device 100 may transmit the shared data to the second electronic device 200 through a High Definition Multimedia Interface (HDMI) cable or a USB cable.

The second electronic device 200 having received the shared data from the first electronic device 100 in operation S10 outputs the shared data received from the first electronic device 100 in operation S12. The second electronic device 200 may receive at least one of display data and voice or vibration multimedia output related data from the first electronic device 100, and accordingly, display predetermined data on the display and also provide various voice or vibration multimedia outputs.

As described above, the first electronic device 100 may share the application with the second electronic device 200. Hereinafter, operation S2 in which the first electronic device 100 forms the connection with the second electronic device 200 will be described in more detail.

Figure 4:
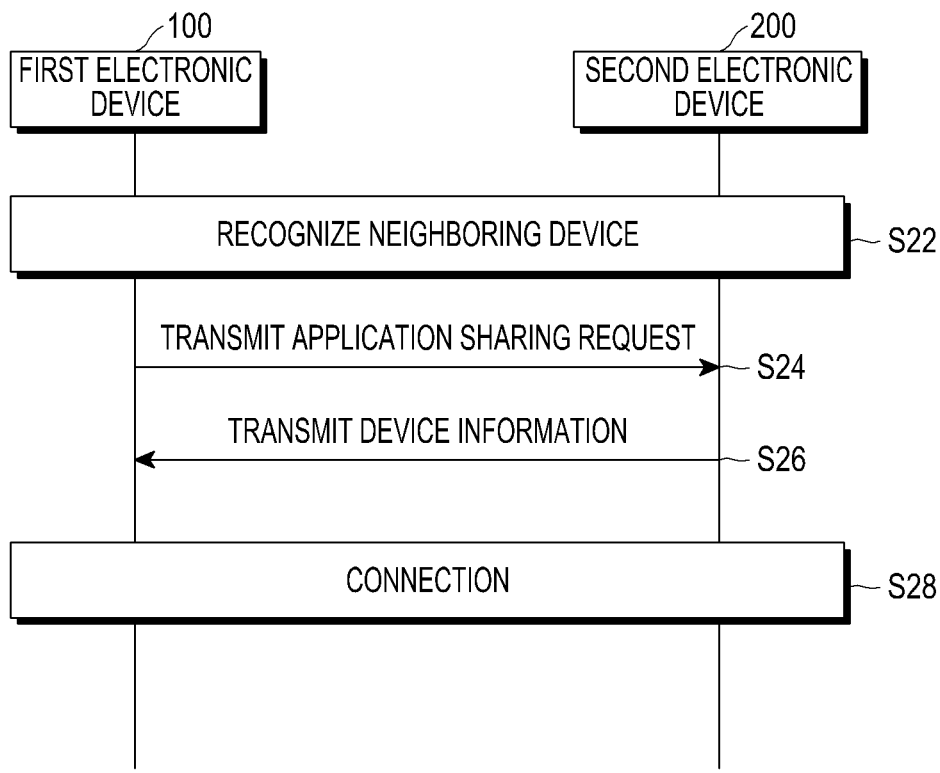
FIG. 4 is a flowchart illustrating a process of a connection between one electronic device and another electronic device according to an embodiment of the present disclosure.

FIG. 4 is a flowchart illustrating a process of forming a connection between one electronic device and another electronic device according to an embodiment of the present disclosure.

Referring to FIG. 4, the connection between the first electronic device 100 and the second electronic device 200 will be described. In FIG. 4, it is assumed that the first electronic device 100 is the host electronic device and the second electronic device 200 is the client electronic device.

The first electronic device 100 first recognizes a neighboring device, for example, the second electronic device in operation S22. The neighboring device may refer to an electronic device which can perform short distance communication with the first electronic device 100. In various embodiments, the neighboring device may refer to an electronic device which can transmit/receive data through a relay server (not shown).

For example, when the first electronic device 100 is set to share an application with another electronic device through a Bluetooth low energy scheme, the first electronic device 100 may recognize the second electronic device 200 based on an advertisement signal transmitted from the second electronic device 200. Further, the first electronic device 100 may recognize a neighboring device based on a method of recognizing another electronic device in the preset short distance communication scheme. In various embodiments, when the first electronic device 100 is set to share an application with another device, for example, the second electronic device 200 through a relay server (not shown), the first electronic device 100 may recognize a neighboring device based on whether the second electronic device 200 is connected to the relay server (not shown).

When the first electronic device 100 recognizes the neighboring device, such as the second electronic device 200, the first electronic device 100 transmits an application sharing request to the second electronic device 200 in operation S24. The application sharing request may include requests for information regarding the application to be shared, device information of the first electronic device 100, an identification of the first electronic device 100, device information of the second electronic device 200 and the like.

The second electronic device 200 transmits the device information of the second electronic device 200 in response to the application sharing request of the first electronic device 100 in operation S26. In various embodiments, the second electronic device 200 may inform the user of application sharing by displaying an inquiry message of the application sharing on the screen 290. Further, the second electronic device 200 may transmit the device information to the first electronic device 100 when the user agrees to the application sharing.

As described above, when the first electronic device 100 receives the device information from the second electronic device 200 in operation S26, the connection between the first electronic device 100 and the second electronic device 200 is formed in operation S28.

Figure 5:
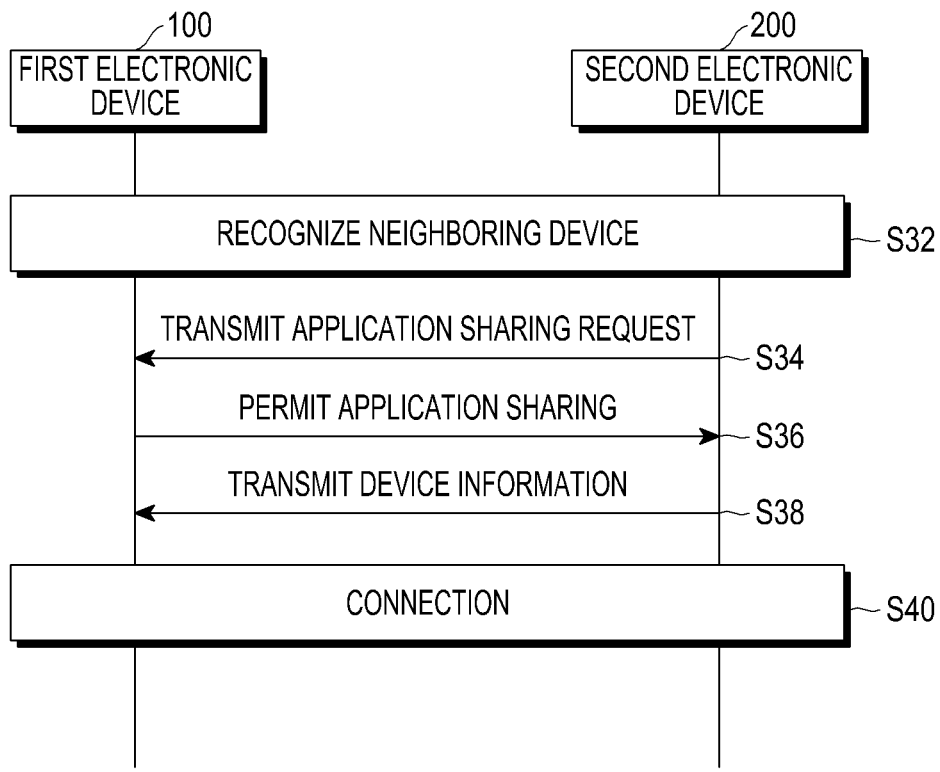
FIG. 5 is a flowchart illustrating a process of a connection between one electronic device and another electronic device according to an embodiment of the present disclosure.

FIG. 5 is a flowchart illustrating a process of forming a connection between one electronic device and another electronic device according to an embodiment of the present disclosure.

Referring to FIG. 5, like in FIG. 4, it is assumed that the first electronic device 100 is the host electronic device and the second electronic device 200 is the client electronic device. On the contrary to the embodiment of FIG. 4, FIG. 5 describes a case in which the second electronic device 200 corresponding to the client electronic device makes a request for sharing an application to the first electronic device 100 corresponding to the host electronic device.

Referring to FIG. 5, the second electronic device 200 first recognizes a neighboring device, for example, the first electronic device 100 in operation S32. As described above in FIG. 4, the second electronic device 200 may recognize a neighboring device based on a method of recognizing another electronic device in the preset short distance communication scheme. In various embodiments, the first electronic device 100 may be set to share an application with the second electronic device 200 through a relay server (not shown). In this event, the second electronic device 200 may recognize the neighboring device, for example, the first electronic device 100 based on whether the first electronic device 100 is connected to the relay server (not shown).

When the second electronic device 200 recognizes the neighboring device, the second electronic device transmits an application sharing request to the first electronic device 100 in operation S34. The application sharing request may include at least one of information regarding the application to be shared and a purpose of the application sharing.

For example, the second electronic device 200 may receive a list of applications which can be shared from the first electronic device 100 and display the application list on the screen 290. Further, the second electronic device 200 may transmit a sharing request for sharing an application selected by user from the applications included in the application list, which can be shared, displayed on the screen 290 as the application to be shared to the first electronic device 100.

The first electronic device 100 having received the application sharing request from the second electronic device 200 permits the corresponding application sharing in operation S36. The first electronic device 100 having received the inquiry message of the application sharing from the second electronic device 200 in operation S34 may display the corresponding inquiry message on the screen 190. The first electronic device 100 may receive a user input for determining whether to share the application with the second electronic device 200 from the user.

The first electronic device 100 may make a request for device information corresponding to the second electronic device 200 to the second electronic device 200 when the user agrees to the application sharing. Accordingly, the second electronic device 200 transmits the device information to the first electronic device 100 in response to the request for the device information in operation S38. When the first electronic device 100 receives the device information from the second electronic device 200, the connection between the first electronic device 100 and the second electronic device 200 is formed in operation S40.

As described above, the first electronic device 100 may form the connection with the second electronic device 200 by itself or form the connection in response to a request for the connection by the second electronic device 200.

FIGS. 6A 6B, 6C, 6D, and 6E illustrate a connection between electronic devices according to an embodiment of the present disclosure.

Referring to FIGS. 6A to 6E, it is assumed that the first electronic device 100 is the host electronic device.

Figure 6A:
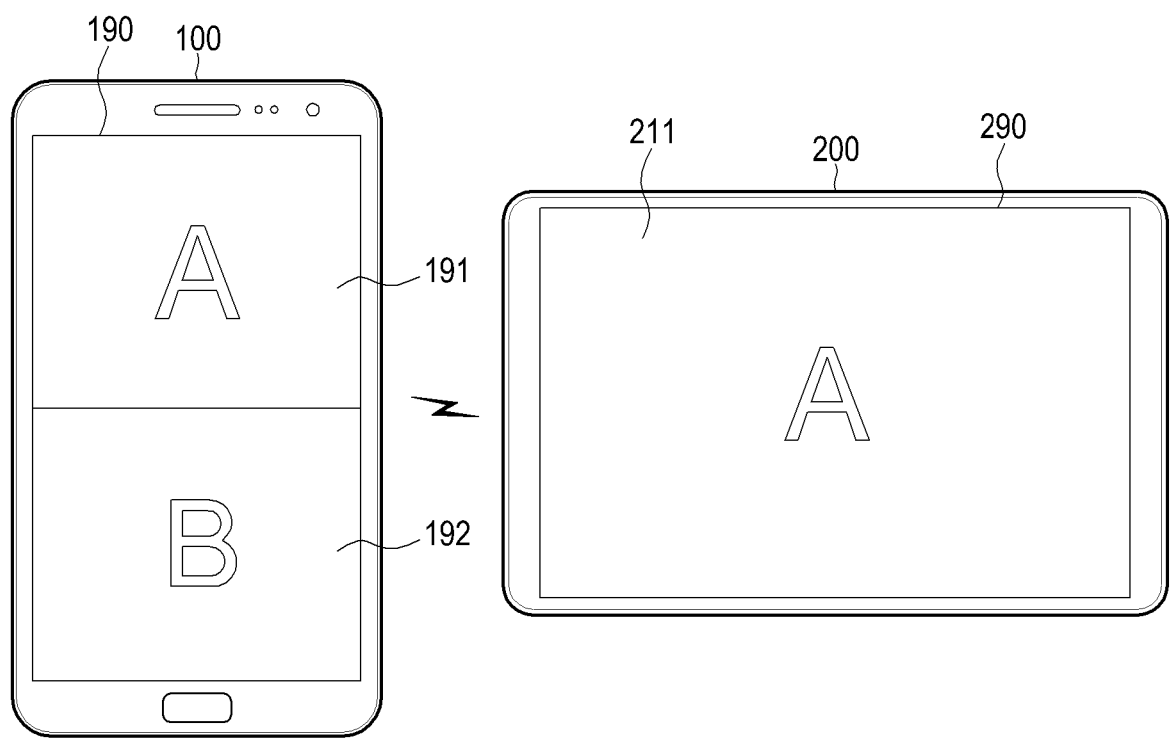
FIGS. 6A, 6B, 6C, 6D, and 6E illustrate connection between electronic devices according to an embodiment of the present disclosure.

As illustrated in FIG. 6A, the first electronic device 100 corresponding to the host electronic device may be connected with the client electronic device, for example, the second electronic device 200 in a 1:1 correspondence. When the first electronic device 100 and the second electronic device 200 are connected to each other, the first electronic device 100 may share the executed first application A with the second electronic device 200. In various embodiments, the first electronic device 100 may share all the executed applications A and B with the second electronic device 200. Further, the first electronic device 100 may share the third application C which is being executed but is not displayed with the second electronic device 200.

Referring to FIG. 6A, the first electronic device 100 corresponding to the host electronic device is connected with the second electronic device 200 corresponding to the client electronic device. Further, the first electronic device 100 executes the first application A and the second application B. The first application execution screen 191 executing the first application A is displayed and the second application execution screen 192 executing the second application B is displayed on the screen 190 of the first electronic device 100. In FIG. 6A, it is assumed that the first electronic device 100 and the second electronic device 200 share only the first application A. The first electronic device 100 may generate shared data corresponding to the first application A or the first application execution screen 191 and transmit the generated shared data to the second electronic device 200. The second electronic device 200 sharing the first application A with the first electronic device 100 may receive the shared data from the first electronic device 100 and display the first application execution screen 211 on the screen 190.

Figure 6B:
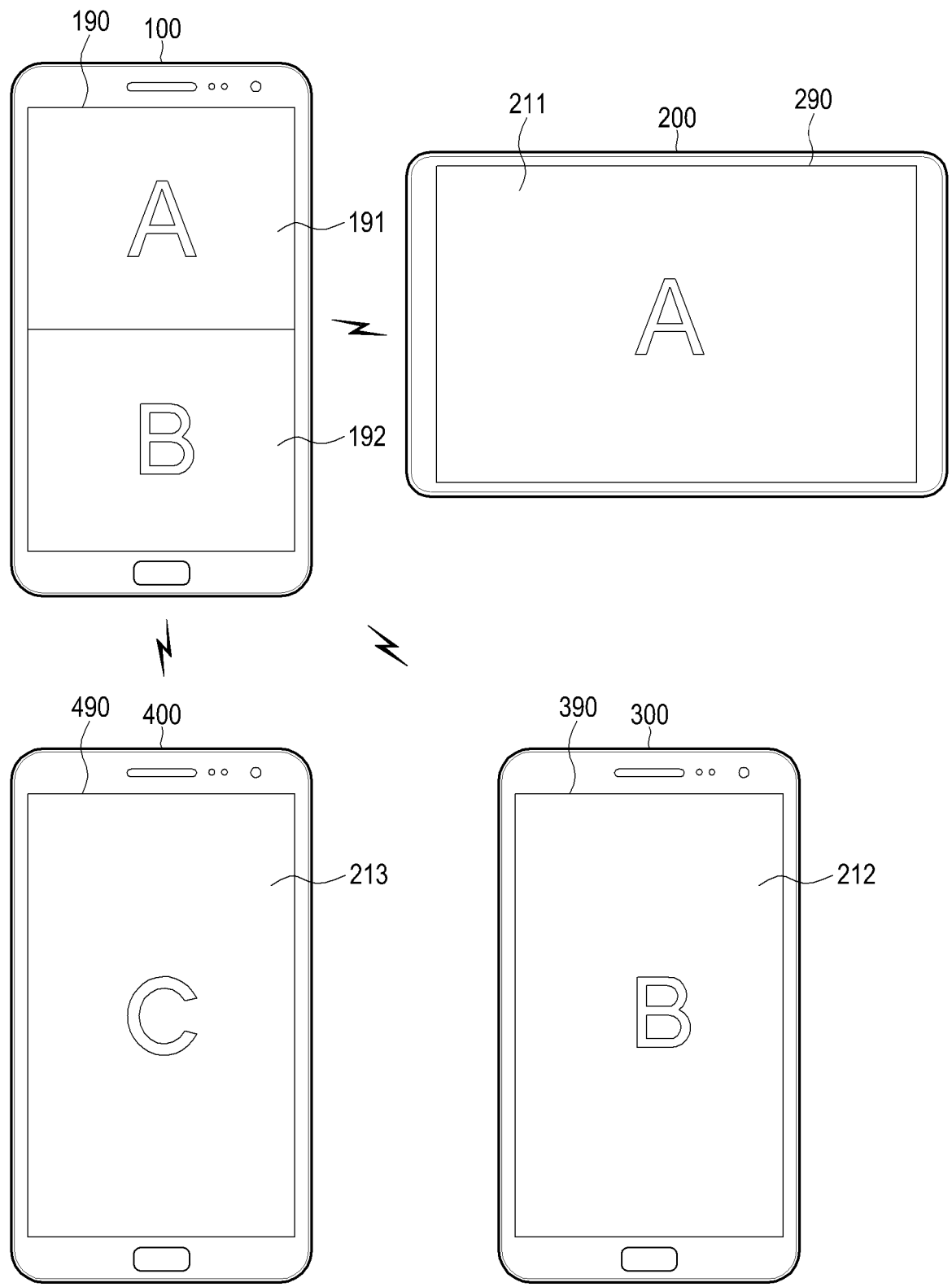

Referring to FIG. 6B, it is assumed that the first electronic device 100 is the host electronic device, and each of the second electronic device 200, the third electronic device 300, and the fourth electronic device 400 is the client electronic device.

As illustrated in FIG. 6B, the first electronic device 100 may share at least one of the first application A, the second application B, and the third application C with each of the second electronic device 200, the third electronic device 300, and the fourth electronic device 400. In FIG. 6B, the first electronic device 100 executes the first application A, the second application B, and the third application C, but displays only the first application execution screen 191 and the second application execution screen 192 on the screen 190. Further, it is assumed that the first electronic device 100 shares the first application A with the second electronic device 200, the second application B with the third electronic device 300, and third application C with the fourth electronic device 400. In FIG. 6B, even though the application execution screen executing the third application C is not displayed on the screen 190 of the first electronic device 100, the first electronic device 100 according to the an embodiment may share the third application C with the fourth electronic device 400 by generating shared data corresponding to the third application and transmitting the generated shared data to the fourth electronic device 400.

Accordingly, the first application execution screen 211 executing the first application A may be displayed on the screen 290 of the second electronic device 200 which shares the first application A with the first electronic device 100. The second application execution screen 212 executing the second application B may be displayed on the screen 390 of the third electronic device 300 which shares the second application B with the first electronic device 100. Further, the third application execution screen 213 executing the third application C may be displayed on the screen 490 of the fourth electronic device 400 which shares the third application C with the first electronic device 100.

Figure 6C:
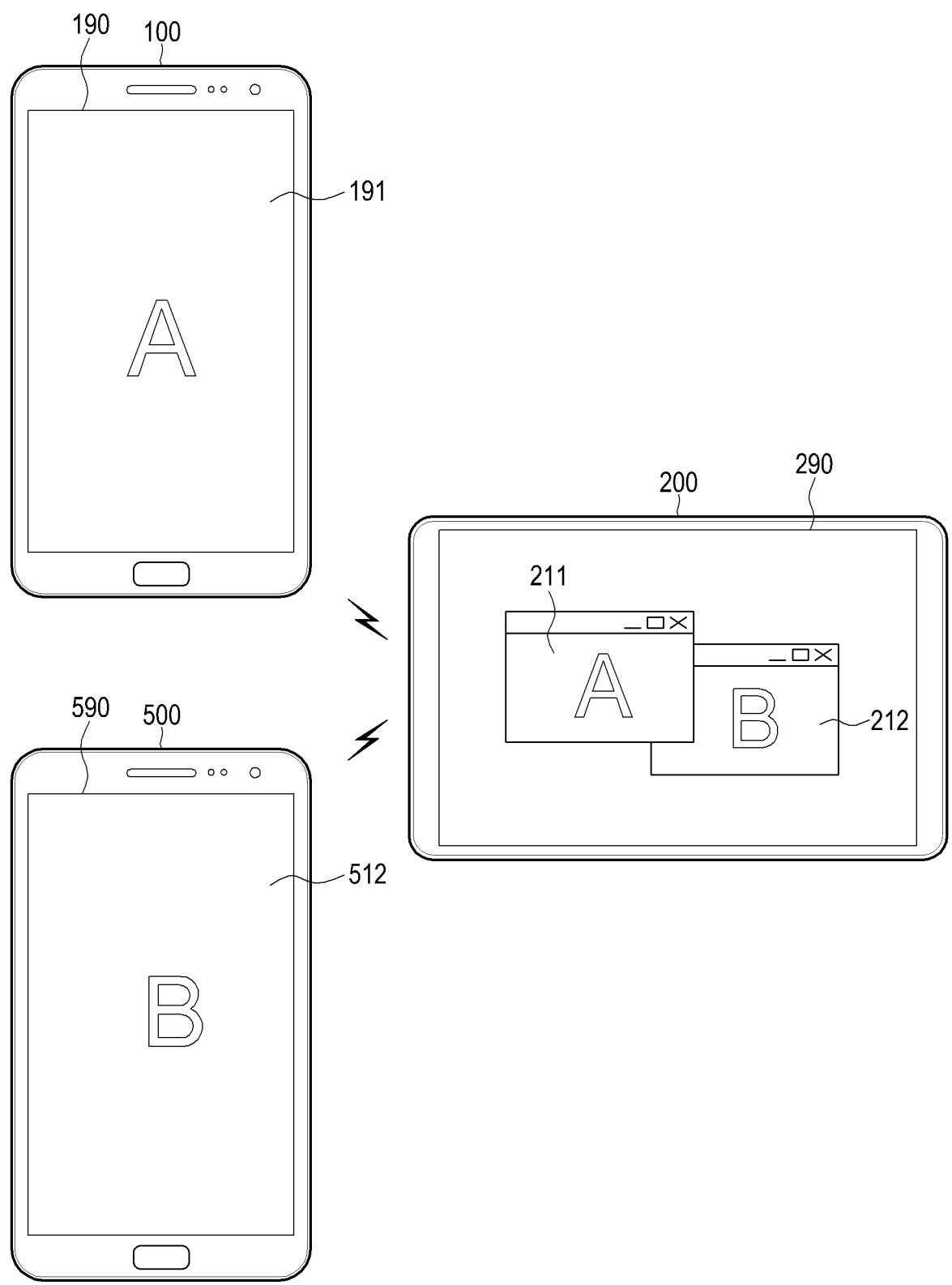

Referring to FIG. 6C, the figure illustrates a concept for describing connections among a plurality of host electronic devices. In FIG. 6C, it is assumed that the host electronic devices are the first electronic device 100 and a fifth electronic device 500.

The first electronic device 100 executes the first application A and accordingly displays the first application execution screen 191 on the screen 190. The fifth electronic device 500 executes the second application B and accordingly displays a second application execution screen 512 on a screen 590.

Referring to FIG. 6C, it is assumed that the first electronic device 100 shares the first application A with the second electronic device 200 corresponding to the client electronic device, and the fifth electronic device 500 share the second application B with the second electronic device 200. Accordingly, the first electronic device 100 may generate first shared data corresponding to the first application A and transmit the first shared data to the second electronic device 200. Further, the fifth electronic device 500 may generate second shared data corresponding to the second application B and transmit the second shared data to the second electronic device 200.

The second electronic device 200 may output the first shared data and the second shared data received from the first electronic device 100 and the fifth electronic device 500 on the screen 290. The second electronic device 200 may display the first application execution screen 211 and the second application execution screen 212 on the screen 290 as illustrated in FIG. 6C.

Further, the second electronic device 200 may display each of the first application execution screen 211 and the second application execution screen 212 in a window form as illustrated in FIG. 6C. The second electronic device 200 may assign a display priority to each of the first application execution screen 211 and the second application execution screen 212. For example, the second electronic device 200 may assign a higher display priority to the first application execution screen 211 in comparison with the second application execution screen 212. Accordingly, the second electronic device 200 may display the application execution screens such that the first application execution screen 211 overlaps a part or all of the second application execution screen 212.

Figure 6D:
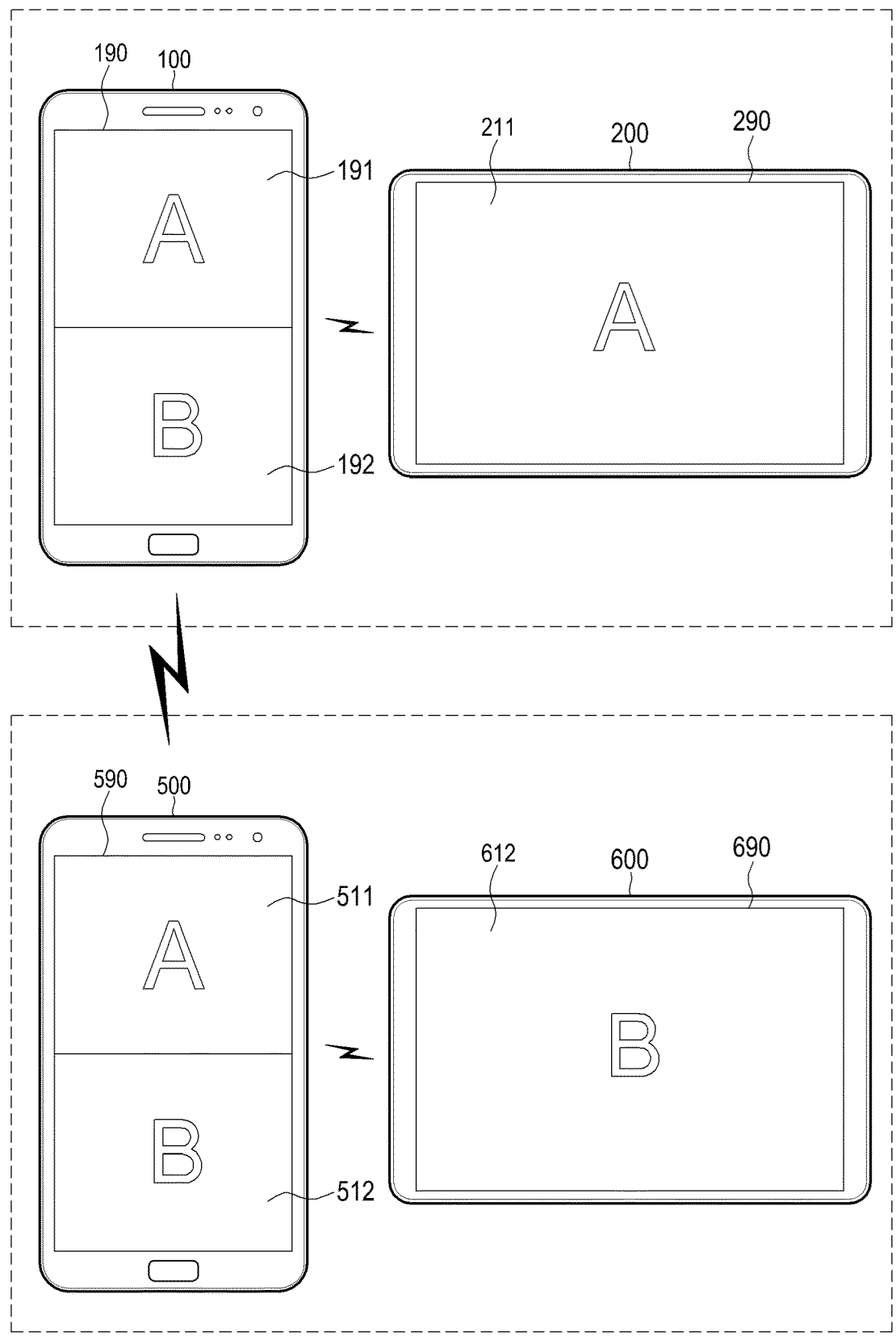

FIG. 6D illustrates concepts of electronic devices according to another embodiment of the present disclosure. In FIG. 6D, it is assumed that the first electronic device 100 and the fifth electronic device 500 are the host electronic devices, and the second electronic device 200 and a sixth electronic device 600 are the client electronic devices. Further, in FIG. 6D, it is assumed that the fifth electronic device 500 operates as the host electronic device with respect to the sixth electronic device 600 and as the client electronic device with respect to the first electronic device 100. Like the fifth electronic device 500, the electronic devices according to an embodiment may operate as both the host electronic device and the client electronic device.

Referring to FIG. 6D, the first electronic device 100 executes the first application A and the second application B. Accordingly, the first application execution screen 191 executing the first application A and the second application execution screen 192 executing the second application B may be displayed on the screen of the first electronic device 100. Further, the first electronic device 100 operating as the host electronic device shares the first application A the second electronic device 200 corresponding to the client electronic device. Accordingly, the second electronic device 200 may display the second application execution screen 211 executing the second application B on the screen 290.

Referring to FIG. 6D, the first electronic device 100 operating as the host electronic device shares the first application A and the second application B with the fifth electronic device 500 operating as the client electronic device. Accordingly, a first application execution screen 511 executing the first application A and a second application execution screen 512 executing the second application B may be displayed on a screen 590 of the fifth electronic device 500.

The fifth electronic device 500 operates as the host electronic device and may share the second application B with the sixth electronic device 600 corresponding to the client electronic device. That is, the fifth electronic device 500 may share the application execution screen 512 executing the second application B with the sixth electronic device 600. Accordingly, the sixth electronic device 600 may display a second application execution screen 612 executing the second application B on a screen 690.

Figure 6E:
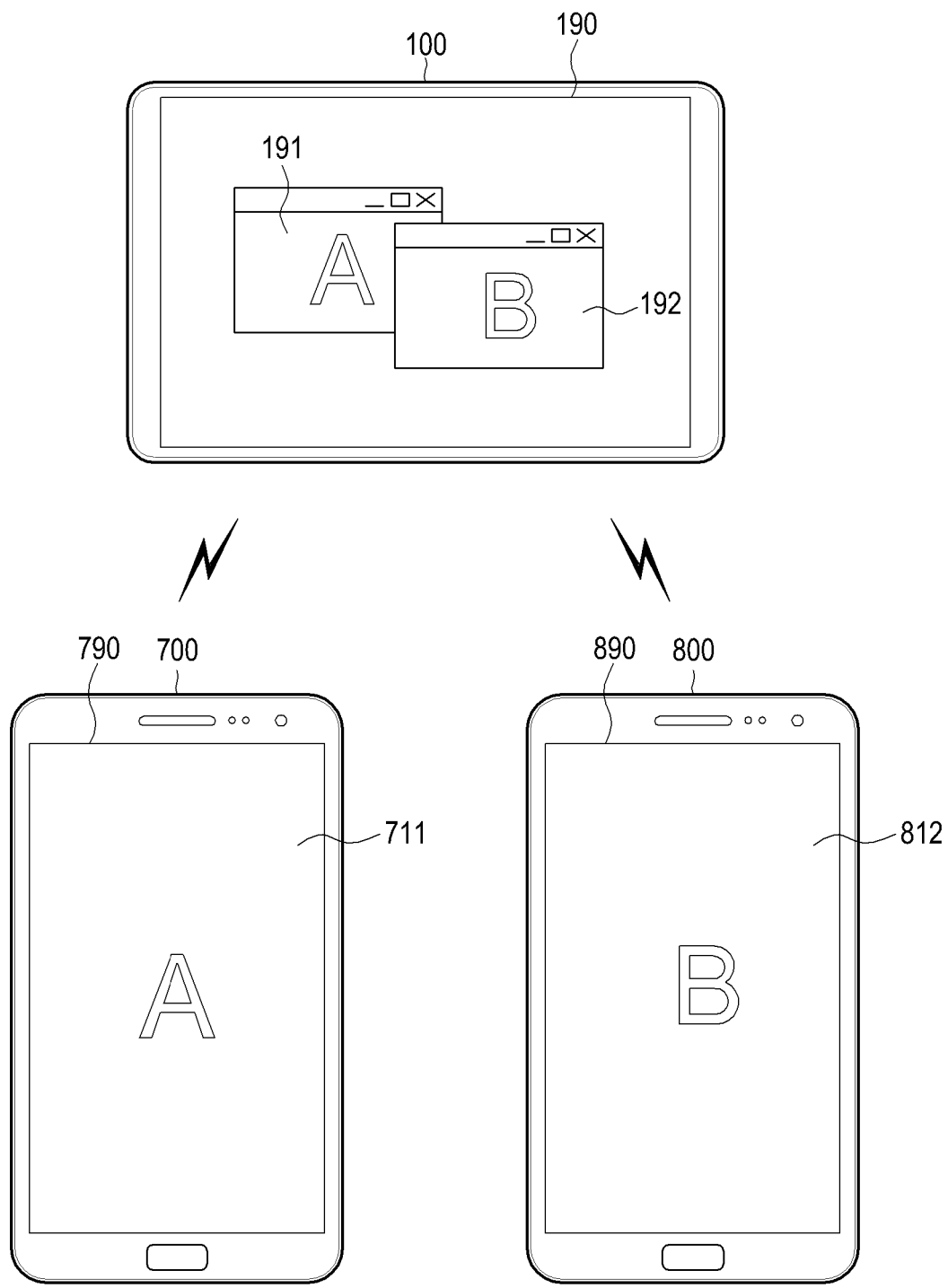

Referring to FIG. 6E, the figure illustrates concepts of electronic devices according to still another embodiment of the present disclosure. In FIG. 6E, it is assumed that the first electronic device 100 is the host electronic device and a seventh electronic device 700 and an eighth electronic device 800 are the client electronic devices. The first electronic device 100 executes the first application A and the second application B. Accordingly, the first electronic device 100 displays the first application execution screen 191 executing the first application A and the second application execution screen 192 executing the second application B on the screen 190. In FIG. 6E, it is assumed that the first electronic device 100 displays the first application execution screen 191 and the second application execution screen 192 in the freestyle mode. That is, the first electronic device 100 may assign a display priority to each of the first application execution screen 191 and the second application execution screen 192. For example, in FIG. 6E, the first electronic device 100 may assign a higher display priority to the second application execution screen 192 in comparison with the first application execution screen 191. Accordingly, the first electronic device 100 may make a control such that the second application execution screen 192 is displayed on the screen 190 in an area of the screen 190 where the first application execution screen 191 and the second application execution screen 192 overlap with each other. That is, the first application execution screen 191 may not be displayed on the screen 190 in an area of the screen 190 where the first application execution screen 191 and the second application execution screen 191 overlap with each other.

Referring to FIG. 6E, it is assumed that the first electronic device 100 corresponding to the host electronic device shares the first application A with the seventh electronic device 700 corresponding to the client electronic device. Further, it is assumed that the first electronic device 100 shares the second application B with the eighth electronic device 800 corresponding to the client electronic device. The first electronic device 100 may transmit the first application execution screen 191 executing the first application A to the seventh electronic device 700 as the first shared data. Further, the first electronic device 100 may transmit the second application execution screen 192 executing the second application B to the eighth electronic device 800 as the second shared data. Accordingly, a first application execution screen 711 executing the first application A may be displayed on a screen 790 of the seventh electronic device 700 and a second application execution screen 812 executing the second application B may be displayed on a screen 890 of the eighth electronic device 800. Particularly, on the contrary to the first application execution screen 191 partially displayed on the screen 190 of the first electronic device 100, the seventh electronic device 700 may display the second application execution screen 711 executing all the first application A on the screen 790.

As described above, the host electronic device may share the application with the client electronic device according to various embodiments. Particularly, the host electronic device may receive shared data from another host electronic device and then share the received shared data with the client electronic device. The first electronic device 100 may preset a group of client electronic devices to be connected with the first electronic device 100. Further, the first electronic device 100 may preset an application to be shared corresponding to a client electronic device to be connected with the first electronic device 100.

Hereinafter, a method in which the host electronic device recognizes the screen will be described.

Figure 7A:
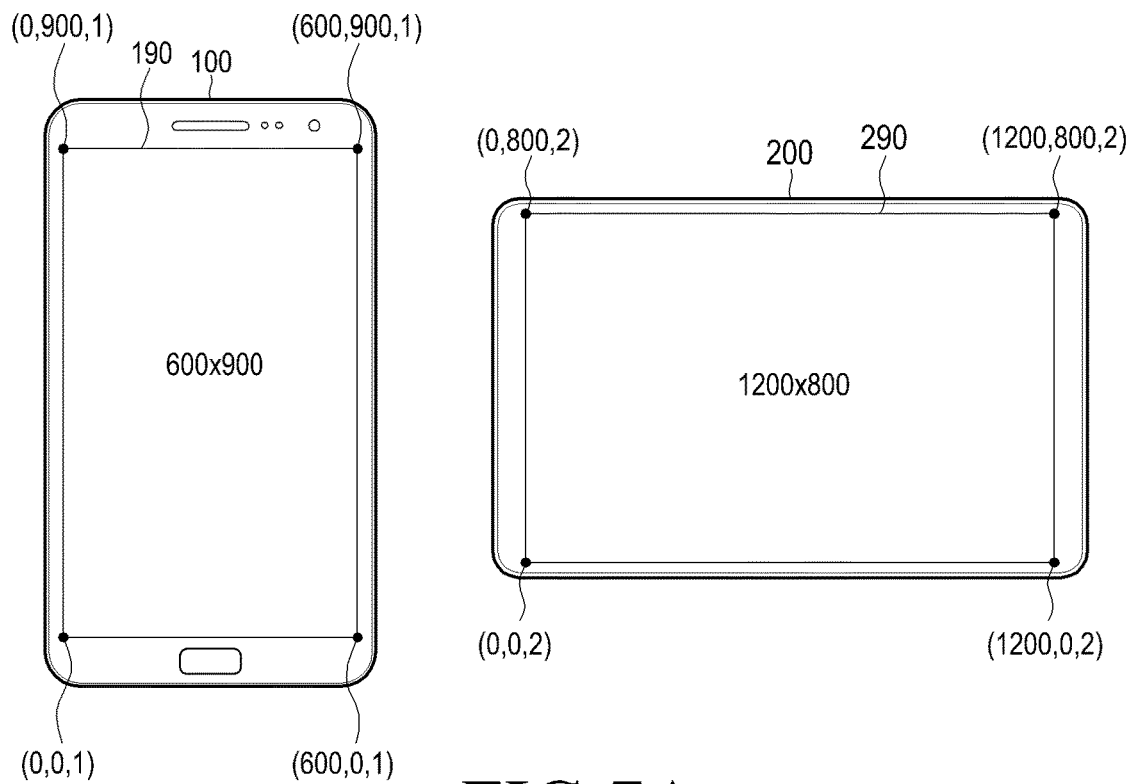
FIGS. 7A and 7B illustrate a coordinate setting method of a host electronic device according to an embodiment of the present disclosure.
Figure 7B:
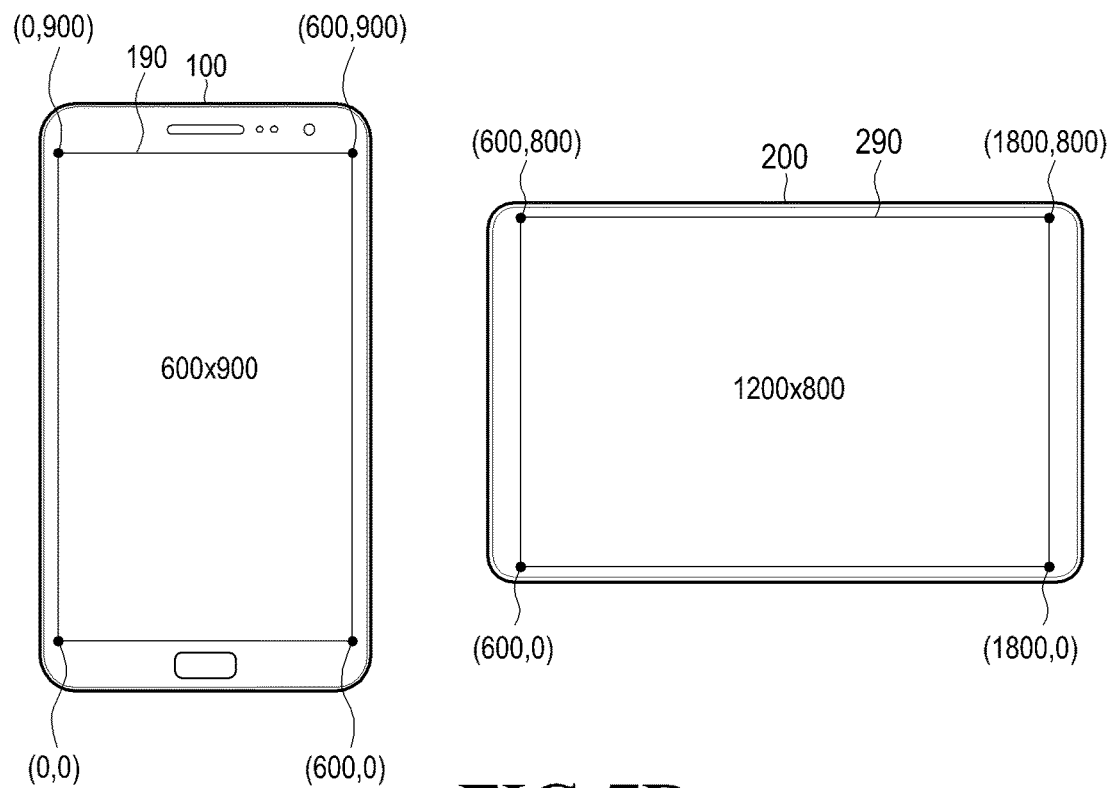

FIGS. 7A and 7B illustrate a coordinate setting method of a host electronic device according to an embodiment of the present disclosure. In FIGS. 7A and 7B, it is assumed that the first electronic device 100 is the host electronic device and the second electronic device 200 is the client electronic device.

Referring to FIG. 7A, it is assumed that the first electronic device 100 corresponding to the host electronic device includes a display having a size of 600 horizontal pixels and 900 vertical pixels, that is, the screen 190. Further, it is assumed that the second electronic device 200 corresponding to the client electronic device includes a display having a size of 1200 horizontal pixels and 800 vertical pixels, that is, the screen 290. As described above, the pixel described as a size unit of the displays, that is, the screens 190 and 290 is only an example, and a display size setting unit may be changed to various units other than the pixel unit by those skilled in the art. Further, the scope of the present disclosure is not limited by the size unit of the screens 190 and 290.

Referring to FIG. 7A, it is assumed that the first electronic device 100 corresponding to the host electronic device forms a connection with the second electronic device 200 corresponding to the client electronic device. As described above, the host electronic device may receive device information corresponding to the client electronic device from the client electronic device while forming the connection with the client electronic device. Accordingly, it is noted through the device information that the first electronic device 100 in FIG. 7A has a display of a size corresponding to 1200 horizontal pixels and 800 vertical pixels, which is implemented by the screen 290 of the second electronic device 200.

In an embodiment, the first electronic device 100 may set a display coordinate of the first electronic device 100 and a display coordinate of the second electronic device 200 based on the device information of the second electronic device 200. At this time, the first electronic device 100 may assign an independent coordinate to each of the first electronic device 100 and the second electronic device 200.

Referring to FIG. 7A, the first electronic device 100 assigns a coordinate of (0, 0, 1) to a lower left end of the screen 190 of the first electronic device 100, a coordinate of (600, 0, 1) to a lower right end of the screen 190, a coordinate of (0, 900, 1) to an upper left end of the screen 190, and a coordinate of (600, 900, 1) to an upper right end of the screen. 190. Two first digits of the coordinate may refer to an x-axis coordinate and a y-axis coordinate on the screen 190 of the first electronic device 100. Further, one last digit may be an electronic device identification number, and it is assumed that an identification number of the first electronic device 100 corresponding to the host electronic device is "1".

The first electronic device 100 corresponding to the host electronic device assigns a coordinate of (0, 0, 2) to a lower left end of the screen 290 of the second electronic device 200 corresponding to the client electronic device, a coordinate of (1200, 0, 2) to a lower right end of the screen 290 of the second electronic device, a coordinate of (0, 800, 2) to an upper left end of the screen 290 of the second electronic device 200, and a coordinate of (1200, 800, 2) to an upper right end of the screen 290 of the second electronic device 200. Two first digits of the coordinate may refer to an x-axis coordinate and a y-axis coordinate on the screen 290. Further, one last digit may be an electronic device identification number, and it is assumed that an identification number of the second electronic device 200 corresponding to the client electronic device is "2".

In an embodiment shown in FIG. 7B, the first electronic device 100 corresponding to the host electronic device may assign one coordinate system to the first electronic device 100 and the second electronic device 200 corresponding to the client electronic device. In FIG. 7B, the first electronic device 100 assigns a coordinate of (0, 0) to a lower left end of the screen 190 of the first electronic device 100, a coordinate of (600, 0) to a lower right end of the screen 190, a coordinate of (0, 900) to an upper left end of the screen 190, and a coordinate of (600, 900) to an upper right end of the screen. 190. Two digits of the coordinate may refer to an x-axis coordinate and a y-axis coordinate on the screen 190.

The first electronic device 100 assigns a coordinate of (600, 0) to a lower left end of the screen 290 of the second electronic device 200 corresponding to the client electronic device, a coordinate of (1800, 0) to a lower right end of the screen 290 of the second electronic device, a coordinate of (600, 800) to an upper left end of the screen 290 of the second electronic device 200, and a coordinate of (1800, 800) to an upper right end of the screen 290 of the second electronic device 200. Two digits of the coordinate may refer to an x-axis coordinate and a y-axis coordinate on the screen 290.

As described above, the first electronic device 100 may set an x-axis coordinate of a start point of the screen 290 of the second electronic device 200 as 600. Accordingly, the first electronic device 100 may assign coordinates which can create an effect as if the screen 290 of the second electronic device 200 is located at a right side of the screen 190 of the first electronic device 100. That is, the first electronic device 100 may assign coordinates such that the screen 290 of the second electronic device 200 has directivity. When the coordinates are assigned as described above, the coordinate (600, 0) of the lower right end of the first electronic device 100 and the coordinate (600, 0) of the lower left end of the second electronic device 200 may be the same. An embodiment may create an effect of using one display by making a setting such that the coordinates of the display of the host electronic device are continuous to the coordinates of the display of the client electronic device. That is, in an embodiment, the screen 190 of the first electronic device 100 and the screen 290 of the second electronic device 200 are connected to each other, and thus may operate as one display.

Assigning the coordinates as if the screen 290 of the second electronic device 200 corresponding to the client electronic device is located at the right side of the screen 190 of the first electronic device 100 corresponding to the host electronic device is only an example. The first electronic device 100 corresponding to the host electronic device may assign coordinates to each of the client electronic devices including the second electronic device 200 as well as the first electronic device 100 in consideration of various directivities of up/down/left/right directions. Accordingly, the first electronic device 100 corresponding to the host electronic device may recognize the screen of the second electronic device 200 corresponding to the client electronic device as a screen expanded from the screen of the first electronic device 100.

An application sharing manager defined by a framework of the first electronic device 100 corresponding to the host electronic device may assign coordinates to the screen 190 of the first electronic device 100 and the screen 290 of the second electronic device 200 corresponding to the client electronic device and manage the coordinates.

Figure 8:
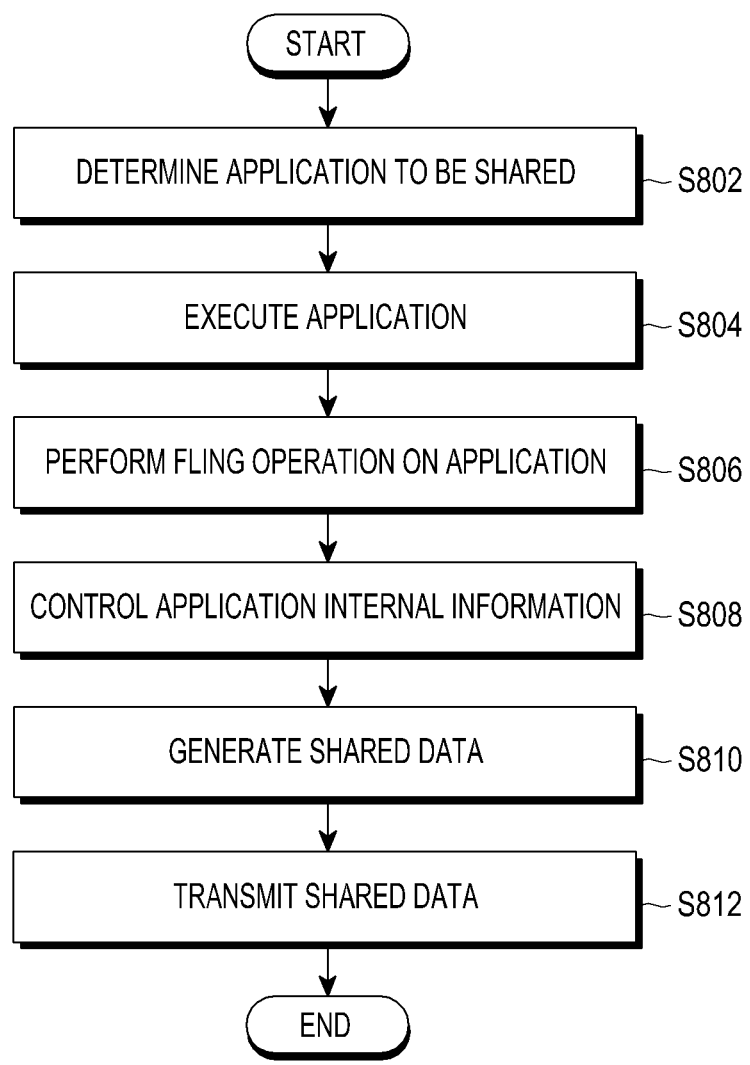
FIG. 8 is a flowchart illustrating a control method of a host electronic device according to an embodiment of the present disclosure.

FIG. 8 is a flowchart illustrating a control method of a host electronic device according to an embodiment of the present disclosure. In FIG. 8, it is assumed that the first electronic device 100 is the host electronic device and the second electronic device 200 is the client electronic device.

Referring to FIG. 8, the first electronic device 100 first determines an application to be shared in operation S802. When the application to be shared, the first electronic device 100 executes the corresponding application to be shared in operation S804 and performs a surface fling operation on the corresponding application in operation S806. As the surface fling operation is performed as described above, the first electronic device 100 may generate shared data to be transmitted to the second electronic device 200 corresponding to the client electronic device. In an embodiment, the first electronic device 100 may first generate display data including an execution screen executing an application shared with the second electronic device 200 as the shared data. In various embodiments, the first electronic device 100 may extract the display data before composing the display data with other display data such as, for example, background screen or other application display data.

In various embodiments, the first electronic device 100 may control internal information of the execution screen of the application to be shared, as the surface fling operation of the application to be shared in operation S808. The first electronic device 100 may control internal information of an application execution screen to be shared, in accordance with the device information of the client electronic device, for example, the second electronic device 200. For example, when the second electronic device 200 is a PC, the first electronic device 100 may convert a version of the application to be shared to a version of the PC or converts a resolution of the application execution screen to be shared to the version of the PC. In various embodiments, when a resolution of the second electronic device 200 is different from a resolution of the first electronic device 100, the first electronic device 100 may convert the resolution of the application execution screen to be shared to the resolution of the second electronic device 200.

Further, although FIG. 8 illustrated operation S808, the control of the internal information in operation S808 can be omitted according to another embodiment. For example, when the first electronic device 100 and the second electronic device 200 are the same device, the internal control process may be omitted.

Thereafter, the first electronic device 100 generates shared data in operation S810. The first electronic device 100 may generate the execution screen of the application to be shared or the application screen in which internal information of the execution screen of the application to be shared is controlled, as the shared data. According to an embodiment of the present disclosure, the first electronic device 100 may generate the shared data by combining the execution screen having the controlled internal information with a voice or vibration multimedia output. That is, the shared data may include the voice or vibration multimedia data as well as the execution screen of the application to be shared. When the shared data is generated in operation S810, the first electronic device 100 transmits the shared data to the second electronic device 200 in operation S812. Although an embodiment has been described in which the first electronic device 100 generates the shared data to be transmitted to the second electronic device 200 corresponding to the client electronic device by performing the surface fling operation for the application to be shared, there may be several methods in which the host electronic device generates the shared data to be shared with the client electronic device according to another embodiment. For example, the first electronic device 100 may generate the shared data by mirroring the screen 190.

Further, according to another embodiment, a screen or an application may be shared between the host electronic device and the client electronic device through the use of a Remote Frame Buffer (RFB) or the like. Accordingly, the host electronic device may generate control information allowing the application to be shared to be executed in the client electronic device and transmit the control information to the client electronic device.

Figure 9:
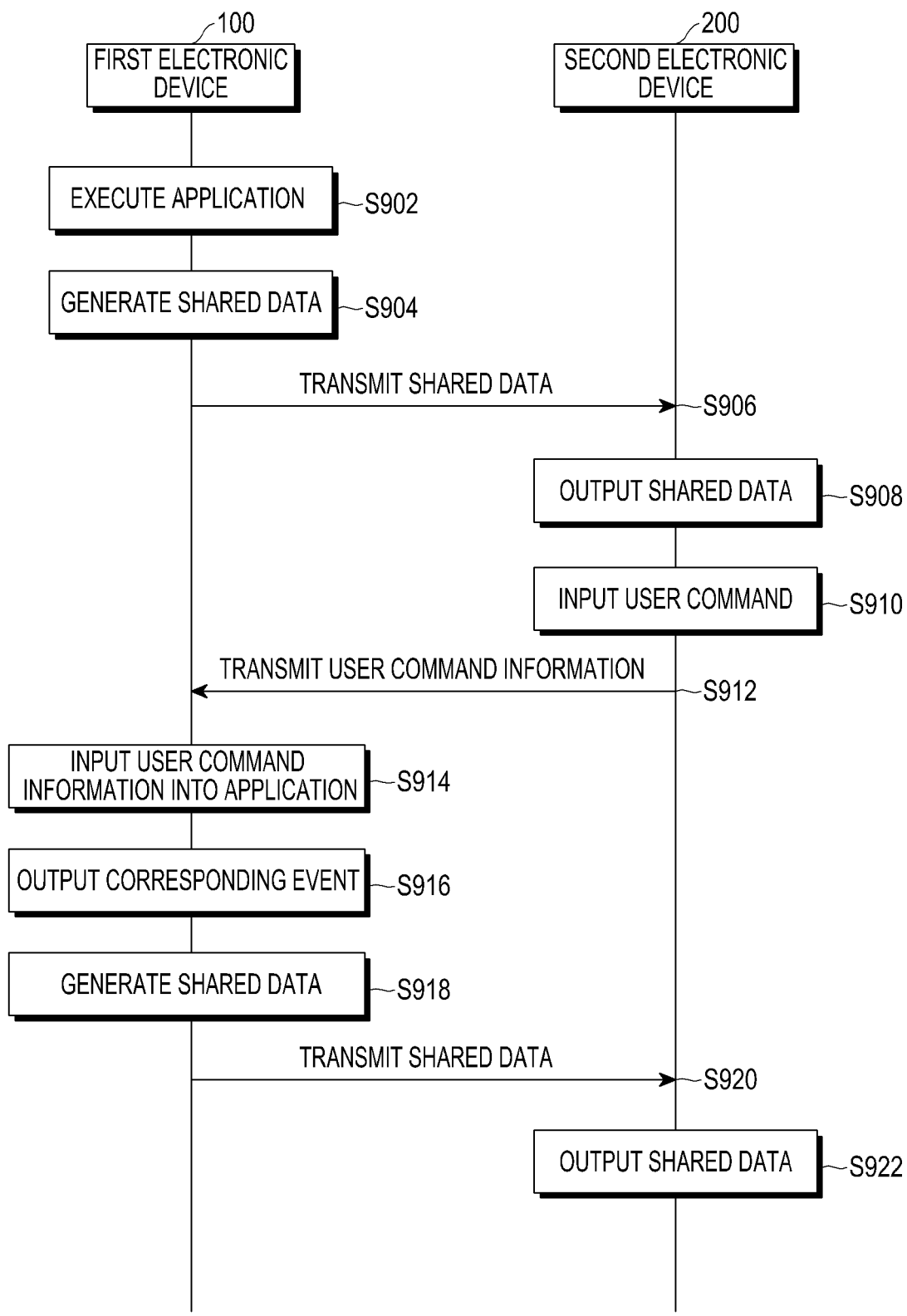
FIG. 9 is a flowchart illustrating a control method of a host electronic device and a client electronic device according to an embodiment of the present disclosure.
Figure 10A:
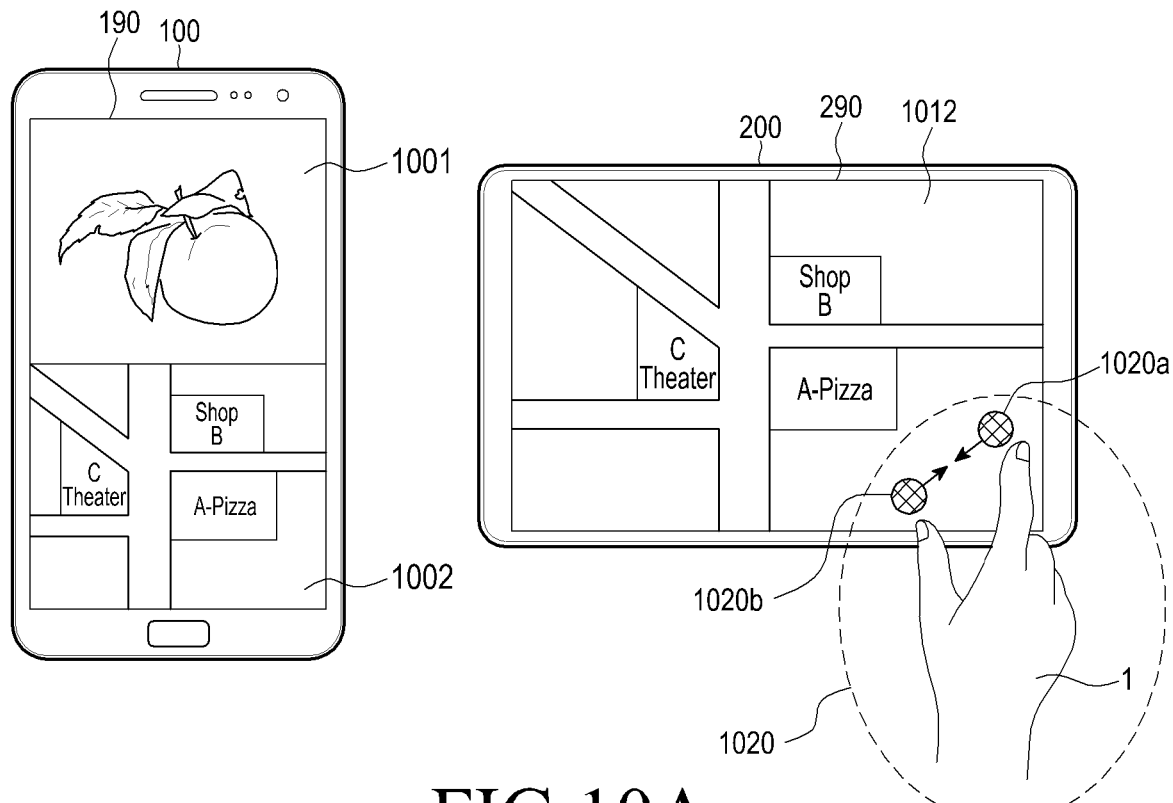
FIGS. 10A and 10B illustrate a host electronic device and a client electronic device sharing data according to an embodiment of the present disclosure.
Figure 10B:
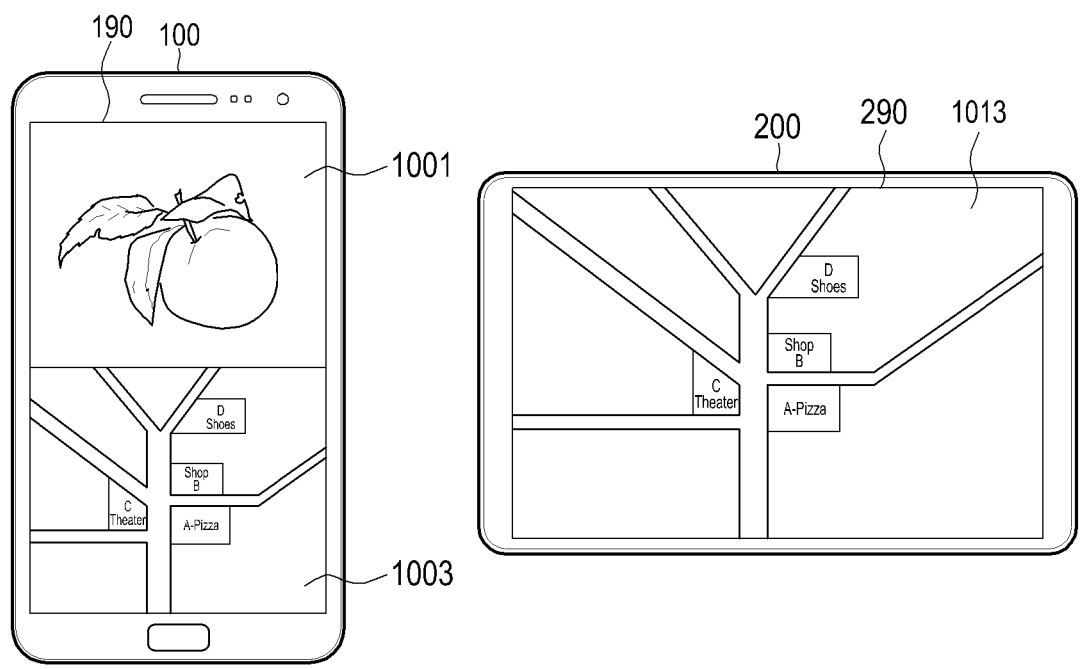

FIG. 9 is a flowchart illustrating a control method of a host electronic device and a client electronic device according to an embodiment of the present disclosure. FIGS. 10A and 10B illustrate an example in which the host electronic device and the client electronic device of FIG. 9 share shared data according to an embodiment of the present disclosure. For convenience of the description, in FIGS. 9, 10A, and 10B, it is assumed that the first electronic device 100 is the host electronic device and the second electronic device 200 is the client electronic device.

Referring to FIG. 9, the host electronic device, that is, the first electronic device 100 executes an application to be shared in operation S902 and generates shared data in operation S904. The first electronic device 100 transmits the generated shared data to the client electronic device, that is, the second electronic device 200 in operation S906. In operation S908, the second electronic device 200 outputs the shared data received from the first electronic device 100 in operation S906. Referring to FIGS. 10A and 10B, the first electronic device 100 may execute a gallery application and a map application to display a first execution screen 1001 executing the gallery application and a second execution screen 1002 executing the map application on the screen 190. Further, the first electronic device 100 may share the map application with the second electronic device 200 by transmitting the shared data to the second electronic device 200. In an embodiment, the shared data may be at least one of the first execution screen 1001 executing the gallery application and the second execution screen 1002 executing the map application. In FIG. 10A, the second electronic device 200 may receive the shared data including the second execution screen 1002 from the first electronic device 100. Accordingly, the second electronic device 200 displays a second execution screen 1012 executing the map application on the screen 290.

Thereafter, a user command may be input into the second electronic device 200 in operation S910. In various embodiments, when the second electronic device 200 receives the shared data, the second electronic device 200 may generate a dummy window for outputting the shared data. In an embodiment, when the user command is input into the client electronic device, that is, the second electronic device 200, the "dummy window" may be a window displayed on the client electronic device (for example, the second electronic device 200) to transmit the user command to the host electronic device, that is, the first electronic device 100. In an embodiment, the user command, for example, a drag gesture, may be input into the second electronic device 200 through the dummy window. The second electronic device 200 may transmit information, such as an input coordinate of the screen 290 into which the drag gesture is input, an input time, and a type of an input gesture, to the first electronic device 100.

Referring to FIG. 10A, a user 1 inputs a pinch-in gesture 1020 into the second electronic device 200 through the screen 290 as a user input. The pinch-in gesture 1020 is a gesture of reducing a distance between a first touch point 1020a and a second touch point 1020b of the screen 290 by the user 1. That is, in FIG. 10A, the user 1 inputs the pinch-in gesture of reducing the distance between a thumb and an index finger into the screen 290 as the user input by closing the distance between the thumb touching the first touch point 1020a of the screen 290 and the index finger touching the second touch point 1020b.

Referring to FIG. 10A again, the second electronic device 200 receives the second execution screen 1002 from the first electronic device 100 as the shared data and may display the second application execution screen 1012 executing the map application on the screen 290. In various embodiments, the second electronic device 200 may generate and place the dummy window on the second execution screen 1012 executing the map application. Further, the second electronic device 200 may make a control such that the dummy window is not displayed on the screen 290 by adjusting transparency of the dummy window. That is, after generating the dummy window through which the user command is input, the second electronic device 200 may make the dummy window transparent and place the dummy window on the window 1012 outputting the application to be shared.

FIG. 10B illustrates the first electronic device 100 and the second electronic device 200 after the pinch-in gesture is input into the second electronic device 100 of FIG. 10A as the user input. Referring to FIG. 10B, the second electronic device 200 may make a control such that the second execution screen 1013 executing the map application is displayed on the screen 290. Further, in various embodiments, the pinch-in gesture 1020 input by the user 1 may be input into the dummy window, not the second execution screen 1012 executing the map application. As described above, when the pinch-in gesture 1020 is input into the dummy window of the second electronic device 200, the second electronic device 200 may transmit the pinch-in gesture 1020 or data related to the pinch-in gesture 1020 to the first electronic device 100 as user command information. The second electronic device 200 may transmit user command information including at least one of an input coordinate on the screen 290 into which the pinch-in gesture 1020 is input, an input time, and a type of an input gesture to the first electronic device 100 as the data related to the pinch-in gesture 1020. As described above, the second electronic device 200 transmits the user command information to the first electronic device 100 in operation S912.

Referring to FIG. 9, the first electronic device 100 receives the user command information from the second electronic device 200 and inputs the user command information received from the second electronic device 200 to the application to be shared in operation S914. As described above, in an embodiment, the user input made into the second electronic device 200 corresponding to the client electronic device may be performed as the user input of the first electronic device 100 executing the application to be shared.

The first electronic device 100 outputs a corresponding event as a result of the input of the user command information into the application to be shared in operation S916. For example, in an embodiment of FIG. 10B, the first electronic device 100 may input the pinch-in gesture 1020 corresponding to the user command information received from the second electronic device 200 into the map application corresponding to the application to be shared, as the user input. In an embodiment, it is assumed that the map application is set to provide a zoomed-out map as an operation corresponding to the pinch-in gesture 1020. Referring to FIGS. 10A and 10B, the first electronic device 100 inputs the pinch-in gesture 1020 into the map application. The map application may perform the operation corresponding to the pinch-in gesture 1020. It is assumed that the operation of the map application corresponding to the pinch-in gesture 1020 zooms-out the map currently displayed on the screen 190.

The first electronic device 100 may control the map application such that the map currently displayed on the screen 190 is zoomed-out in response to the pinch-in gesture 2030 input through the second electronic device 200. Accordingly, as illustrated in FIG. 10B, the third execution 1003 having the map which is more zoomed-out than the map of the second execution screen 1002 may be displayed on the screen 190 of the first electronic device 100.

Referring back to FIG. 9, since the event corresponding to the user command information has been output in operation S916, the first electronic device 100 generates shared data again in operation S918. When the shared data is generated again, the first electronic device 100 transmits the shared data to the second electronic device 200 in operation S920.

The second electronic device 200 having received the shared data from the first electronic device 100 in S9200 outputs the shared data in operation S922. For example, referring to FIG. 10B, the second electronic device 200 may receive the third execution screen 1003 displayed on the first electronic device 100 from the first electronic device 100 as the shared data. Since the third execution screen 1003 has the map zoomed-out from the map displayed on the second execution screen 1002 of FIG. 10A, the second electronic device 200 may display the third execution screen 1013 having a map zoomed-out from a map displayed on the second execution screen 1012 on the screen 290, like the third execution screen 1003.

Figure 11:
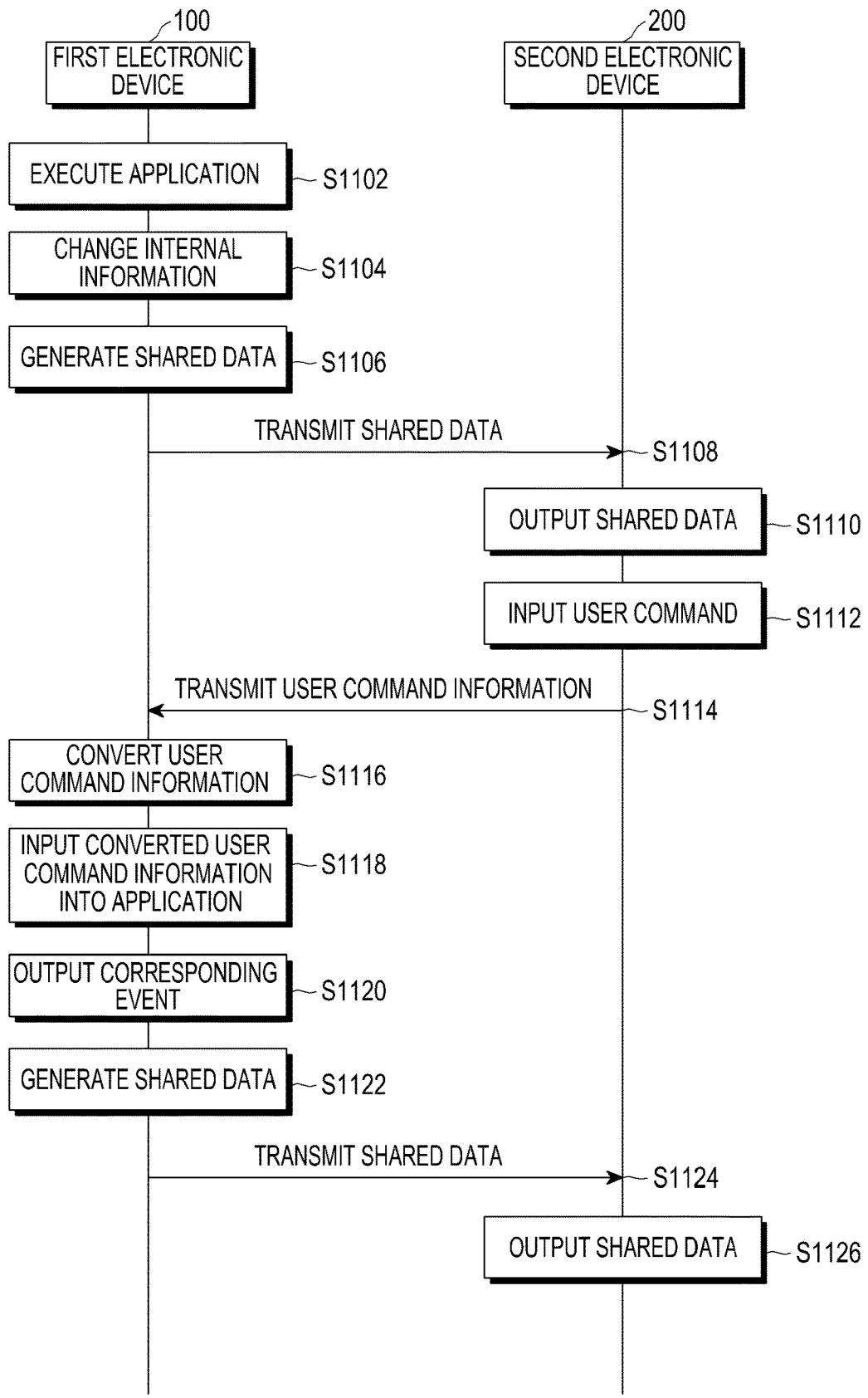
FIG. 11 is a flowchart illustrating a method in which a host electronic device and a client electronic device share data according to an embodiment of the present disclosure.

FIG. 11 is a flowchart illustrating a method in which a host electronic device and a client electronic device share data according to an embodiment of the present disclosure.

Referring to FIG. 11, it is assumed that the first electronic device 100 is the host electronic device and the second electronic device 200 is the client electronic device. The first electronic device corresponding to the host electronic device executes an application in operation S1102. When the application is executed, the first electronic device 100 changes internal information of the application in operation S1104. Thereafter, the first electronic device 100 generates shared data to be shared with the second electronic device 200 in operation S1106. In an embodiment, the first electronic device 100 may change internal information of an execution screen executing an application which is being shared with the second electronic device 200, that is, an application to be shared and generate shared data. The first electronic device 100 transmits the shared data to the second electronic device 200 in operation S1108.

The second electronic device 200 receives the shared data received from the first electronic device 100 corresponding to the host electronic device in operation S1108. The second electronic device 200 may display and output the shared data received from the first electronic device 100 on the screen 290 in operation S1110. Thereafter, the second electronic device 200 receives a user command from the user in operation S1112 and transmits user command information corresponding to the user input to the first electronic device 100 in operation S1114.

For example, the second electronic device 200 may receive a user input corresponding to touching one point of the screen 290 from the user. Further, as described above, the second electronic device 200 transmits user command information (for example, a coordinate of the point where the user input is performed) corresponding to the user input made into the second electronic device 200 to the first electronic device 100, so that the first electronic device 100 can perform an operation according to the user input.

The first electronic device 100 converts the user command information received from the second electronic device 200 such that the user command information can be applied to the first electronic device 100 in operation S1116. In various embodiments, the first electronic device 100 may convert the user command information based on the change in the internal information in operation S1104. For example, the resolution of the first electronic device 100 and the resolution of the second electronic device 200 may be different from each other. When the resolutions are different from each other, even a user input for selecting the same object has a different input coordinate according to the device. For example, when it is assumed that a coordinate of a particular object is (350, 50) in the first electronic device 100, a coordinate in the second electronic device 200 may be (700, 160). The first electronic device 100 may change the internal information by switching the coordinate (350, 50) to the coordinate (700, 160) in operation S1104. Further, the user command information received from the second electronic device 200 may be converted based on the change in the internal information by switching the coordinate (700, 160) to the coordinate (350, 50) in operation S1116.

The first electronic device 100 inputs the converted user command information into the application in operation S1118. The application of the first electronic device 100 may receive the converted user command information and output an event corresponding to the user command information. When the event corresponding to the user command information is output from the application in operation S1120, the first electronic device 100 generates shared data corresponding to the event in operation S1122. The first electronic device 100 transmits the shared data corresponding to the event to the second electronic device 200 in operation S1124. The second electronic device 200 receives the shared data from the first electronic device 100 as a result of the user command of operation S1112 in S1124. The second electronic device 200 outputs the shared data in operation S1126.

Figure 12:
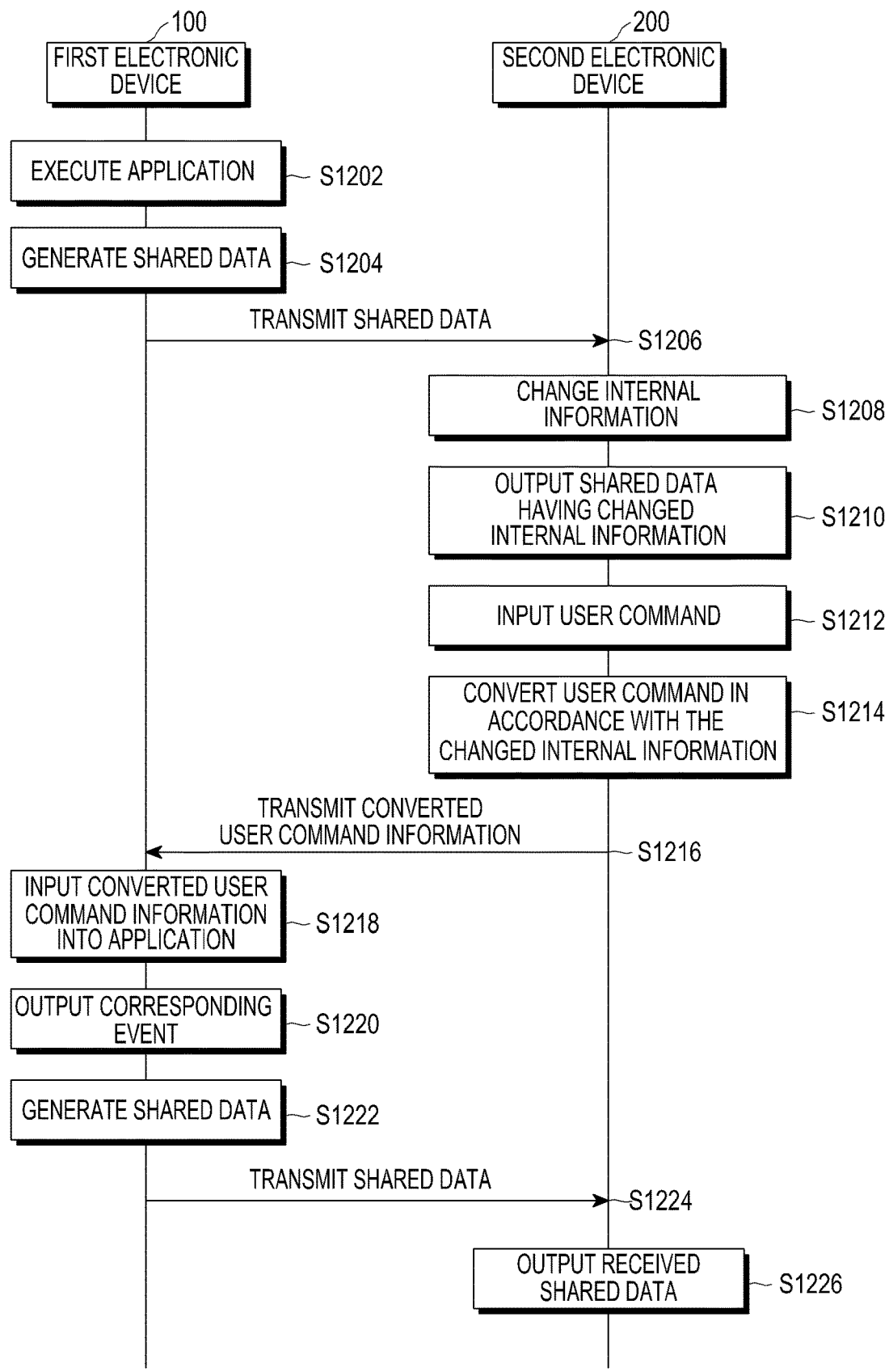
FIG. 12 is a flowchart illustrating a method in which a host electronic device and a client electronic device share data according to an embodiment of the present disclosure.

FIG. 12 is a flowchart illustrating a method in which a host electronic device and a client electronic device share data according to an embodiment of the present disclosure.

Referring to FIG. 12, it is assumed that the first electronic device 100 is the host electronic device and the second electronic device 200 is the client electronic device.

The first electronic device 100 corresponding to the host electronic device executes an application which is being shared with the second electronic device 200 in operation S1202. When the application is executed, the first electronic device 100 generates shared data to be shared with the second electronic device 200 in operation S1204. When the shared data is generated, the first electronic device 100 transmits the shared data to the second electronic device 200 in operation S1206.

The second electronic device 200 having received the shared data from the first electronic device 100 changes internal information of the shared information in operation S1208. The second electronic device 200 according to an embodiment may change the internal information of the shared data to output the shared data received from the first electronic device 100. The second electronic device 200 according to an embodiment may change the internal information of the shared data received from the first electronic device 100 by converting the shared data to have a format which can be output by the second electronic device 200.

The second electronic device 200 outputs the shared data having the changed internal information in operation S1210. In operation 1210, the screen 290 of the second electronic device 200 may display the shared data converted to have the format which can be output by the second electronic device 200.

Thereafter, a user command may be input into the second electronic device 200 by the user in operation S1212. For example, a user input of touching one point of the screen 290 may be input into the second electronic device 200 by the user.

The second electronic device 200 converts the user command in accordance with the change in the internal information in operation S1214. In operation 1214, the second electronic device 200 according to an embodiment may convert the user command in accordance with the change in the internal information by converting the user command input in operation S1212 to have a format which can be read by the first electronic device 100. For example, the second electronic device 200 may coordinate-convert user command information (for example, a coordinate of a point on the screen 290 where the user input is made) corresponding to the user input made in the second electronic device 200 to be applicable to the application of the first electronic device 100.

The second electronic device 200 transmits the converted user command information to the first electronic device 100 in operation S1216. The first electronic device 100 inputs the converted user command information to the application in operation S1218. The application of the first electronic device 100 may receive the converted user command information and output an event corresponding to the user command information. When the event corresponding to the user command information is output from the application in operation S1220, the first electronic device 100 generates shared data corresponding to the event in operation S1222. The first electronic device 100 transmits the shared data corresponding to the event to the second electronic device 200 in operation S1224. In operation S1224, the second electronic device 200 receives the shared data from the first electronic device 100 as a result of the user command of operation S1212. The second electronic device 200 outputs the shared data in operation S1226. In various embodiments, the second electronic device 200 may change internal information of the shared data received from the first electronic device 100 in operation S1224 and output the converted shared data having the changed internal information in operation S1226.

Figure 13A:
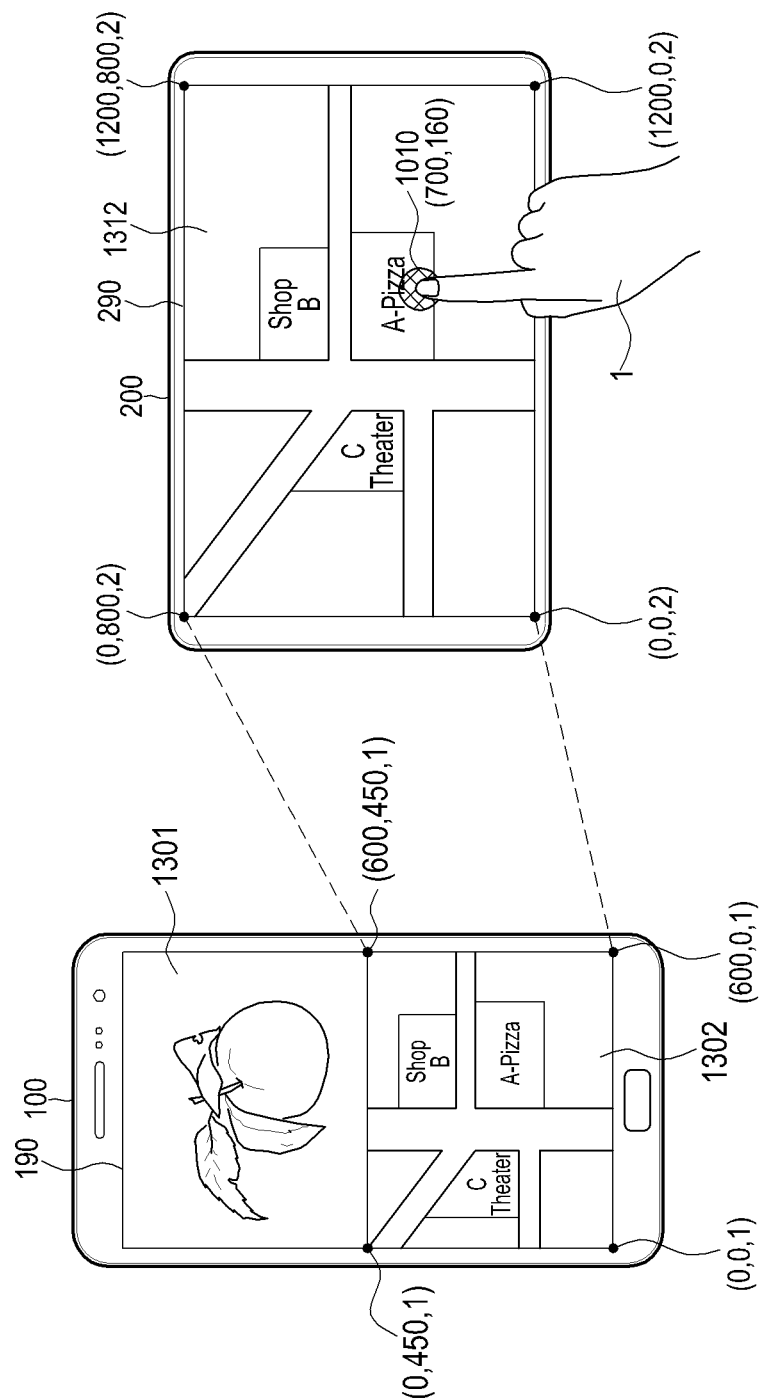
FIGS. 13A, 13B, and 13C illustrate a method in which a host electronic device and a client electronic device share data according to an embodiment of the present disclosure.
Figure 13B:
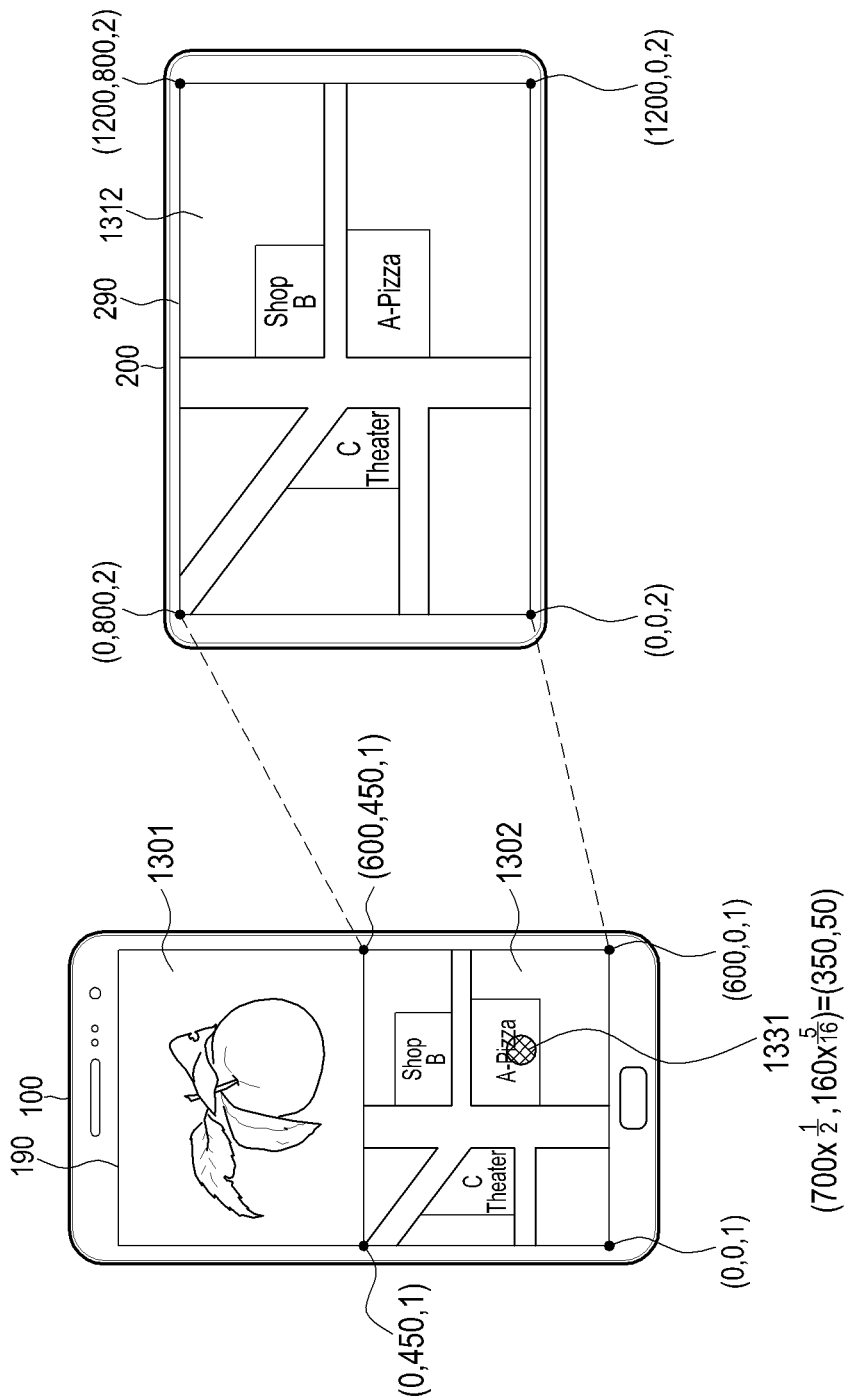
Figure 13C:
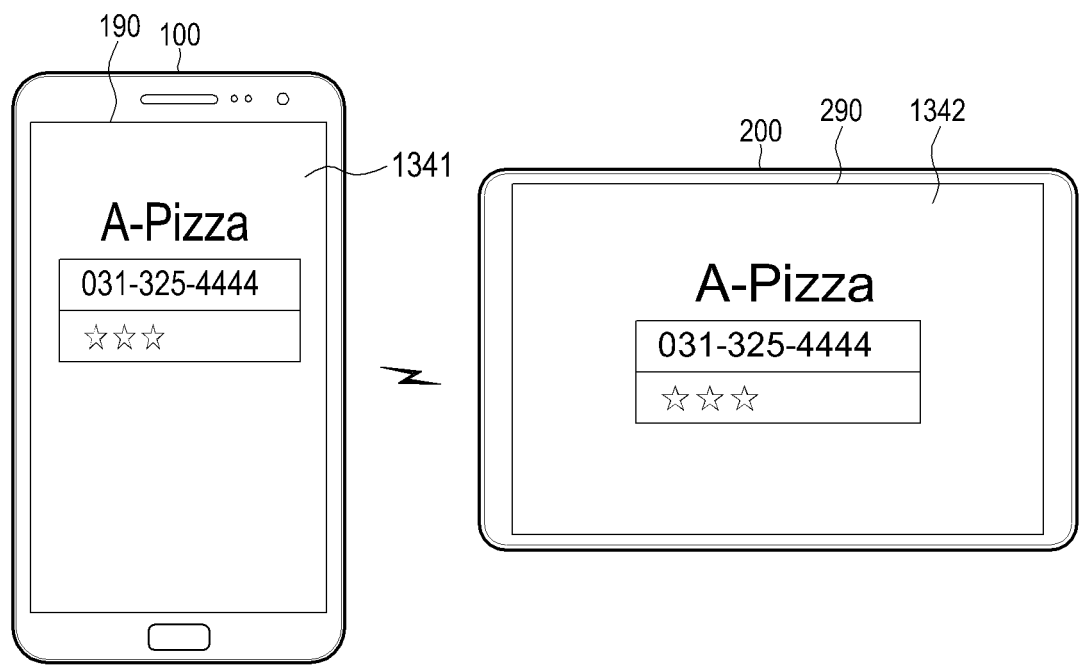

FIGS. 13A, 13B, and 13C illustrate a method in which a host electronic device and a client electronic device share shared data according to an embodiment of the present disclosure.

Referring to FIG. 13A, the first electronic device 100 may include a display having 600 horizontal pixels and 900 vertical pixels, that is, the screen 190. The second electronic device 200 may include a display having 1200 horizontal pixels and 800 vertical pixels, that is, the screen 290. The pixel described as a size unit of the displays, that is, the screens 190 and 290 is only an example, and a display size setting unit may be changed to various units other than the pixel unit by those skilled in the art. Further, the scope of the present disclosure is not limited by the size unit of the screens 190 and 290.

Referring to FIG. 13A, the first electronic device 100 displays a first execution screen 1301 executing a gallery application on an upper side of the screen 190 and a second execution screen 1302 executing a map application on a lower side of the screen 190. In an embodiment of FIG. 13A, the first electronic device 100 may set separate coordinates corresponding to each of the first electronic device 100 and the second electronic device 200. The first electronic device 100 may display an execution screen of the map application, that is, the second execution screen 1302 on a rectangular area having four edges of coordinates (0, 0, 1), (0, 450, 1), (600, 0, 1), and (600, 450, 1).

The first electronic device 100 may change internal information such that the second execution screen 1302 is displayed on an entire surface of the screen 290 of the client electronic device 200. For example, in the embodiment of FIG. 13A, the first electronic device 100 corresponding to the host electronic device horizontally enlarges a size of the second execution screen 1302 twice and vertically enlarges the size of the second execution screen 1302 16/5 times.

The first electronic device 100 may generate shared data having the changed internal information of the second execution screen 1302. The first electronic device 100 may transmit the shared data having the changed internal information to the second electronic device 200 corresponding to the client electronic device. The second electronic device 200 may display the shared data received from the first electronic device 100 on the screen 290. As illustrated in FIG. 13A, the second electronic device 200 may display the shared data having the changed internal information, that is, a second execution screen 1312 with a size of 1200×800. As described above, in FIG. 13A, the first electronic device 100 may allow the second execution screen 1302 to be applied to the resolution of the second electronic device 200 through the change in the internal information.

Referring to FIG. 13A, the second electronic device 200 receives a user command. The user 1 may click a position corresponding to "A-Pizza" of the second execution screen 1312 as indicated by a reference numeral 1010. More specifically, the user 1 may touch a point of (700, 160) of the screen 290. At this time, the touch may be input into the first electronic device 100 or the second electronic device 200 as a user command. Further, the user command may be transmitted to the first electronic device 100 by the second electronic device 200 as user command information.

The second electronic device 200 may transmit the user command information to the first electronic device 100. For example, the second electronic device 200 may transmit information indicating that a touch gesture 1332 has been input into the point (700, 160) of the display 290 by the user 1 to the first electronic device 100.

The first electronic device 100 may convert the user command information in accordance with the change in the internal information. In FIG. 13A, the first electronic device 100 may change the internal information by horizontally enlarging a size of the second execution screen 1302 executing the map application corresponding to the application to be shared twice and vertically enlarging the size of the second execution screen 1302 16/5 times. Further, in an embodiment, the first electronic device 100 may convert the user command information received from the second electronic device 200 by multiplying horizontal and vertical coordinates by 1/2 and 5/16 which are reciprocal numbers of the enlargement ratios according to the user command information.

Referring to FIG. 13B, the first electronic device 100 may change a touch gesture input 1331 on the point (700, 160) corresponding to the user command information to a touch gesture 1331 input on the point (350, 50) generated by multiplying the horizontal coordinate and the vertical coordinate by 1/2 and 5/16, respectively in accordance with the change in the internal information.

The first electronic device 100 may input the touch gesture 1331 on the point (350, 50) corresponding to the converted user command information into the application to be shared, for example, the map application of FIGS. 13A and 13B. The first electronic device 100 may output an event corresponding to the converted user command information and generate shared data. The first electronic device 100 may transmit the shared data to the second electronic device 200 and output the shared data received from the first electronic device 100 through, for example, the screen 290.

For example, the first electronic device 100 may determine that the touch gesture 1331 has been input on an object of "A-Pizza" in response to the user command information. The first electronic device 100 may input the touch gesture 1331 into the map application as the user command.

Referring to FIG. 13C, the first electronic device 100 may display a third execution screen 1041 including information regarding "A-Pizza" on the screen 190 as the event corresponding to the user command. The first electronic device 100 may transmit the third execution screen 1041 to the second electronic device 200 as the shared data and the second electronic device 200 may display a third execution screen 1042. In various embodiments, the second electronic device 200 may change internal information of the third execution screen 1041 received from the first electronic device 100 to generate the third execution screen 1042 and output the generated third execution screen 1042 through the screen 290.

Figure 14:
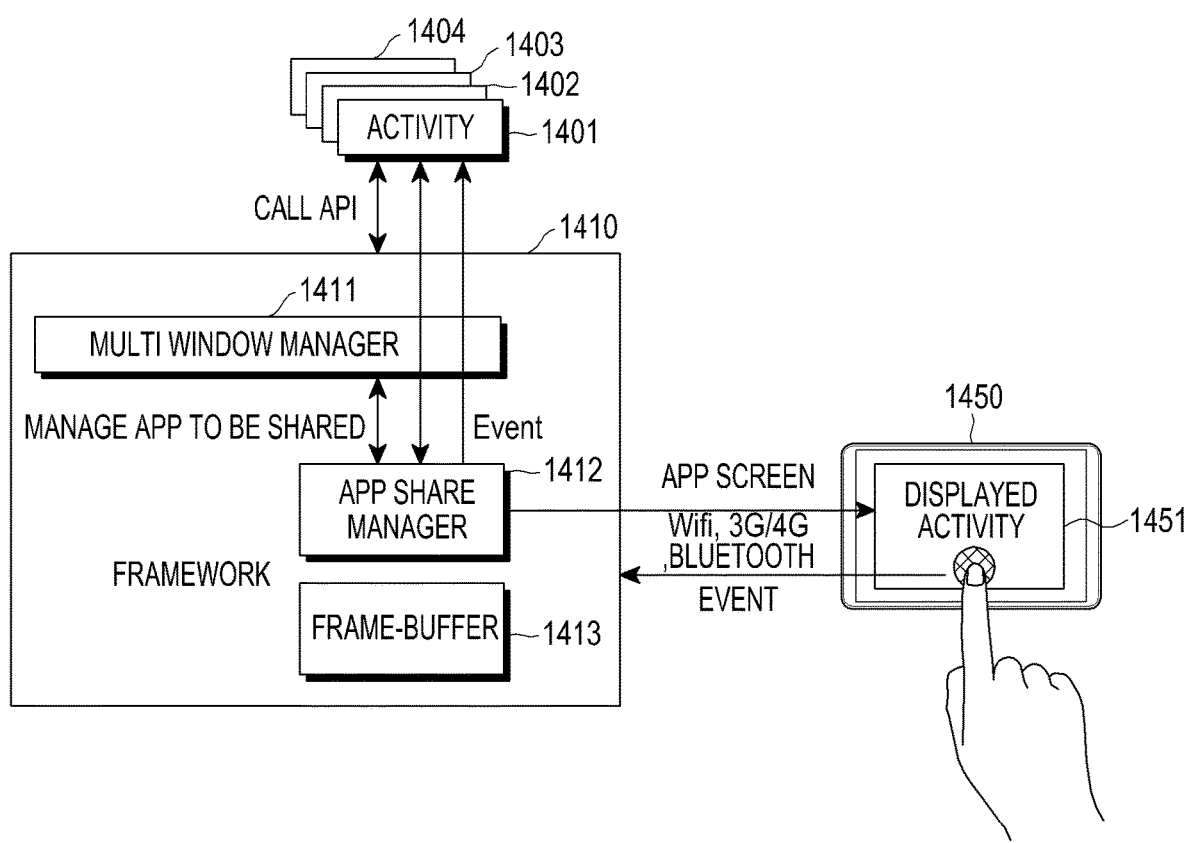
FIG. 14 illustrates a system architecture of a host electronic device according to an embodiment of the present disclosure.

FIG. 14 illustrates a system architecture of a host electronic device according to an embodiment of the present disclosure.

Referring to FIG. 14, a multi window manager 1411, an application share manager 1412, and a frame buffer 1413 may be defined in a framework 1410 of the host electronic device. The multi window manager 1411 may manage sizes, transparency, positions, dpi, and resolutions of a plurality of windows corresponding to a plurality of applications executed by the client electronic device. One or more activities 1401 to 1404 may load an API from the multi window manager 1411 and process the loaded API. The multi window manager 1411 may provide callback. The multi window manager 1411 may make a management such that one or more activities 1401 to 1404 are displayed on the host electronic device.

The multi window manager 1411 may provide the application to be shared to the application share manager 1412 and the application share manager 1412 may transmit shared data of the application to be shared to a client electronic device 1450. Alternatively, the application share manager 1412 may directly receive the application to be shared and transmit the received application.

The frame buffer 1413 may temporarily store the shared data to be transmitted. The application share manager 1412 may transmit an application screen based on various communication schemes such as WiFi, 3G/4G data communication, Bluetooth and the like. The client electronic device 1450 may display a received application screen 1451.

When the client electronic device 1450 receives an event from the user, the client electronic device 1450 may transmit the received event to the application share manager 1412. The application share manager 1412 may output the received event to the corresponding activities 1401 to 1404.

Figure 15:
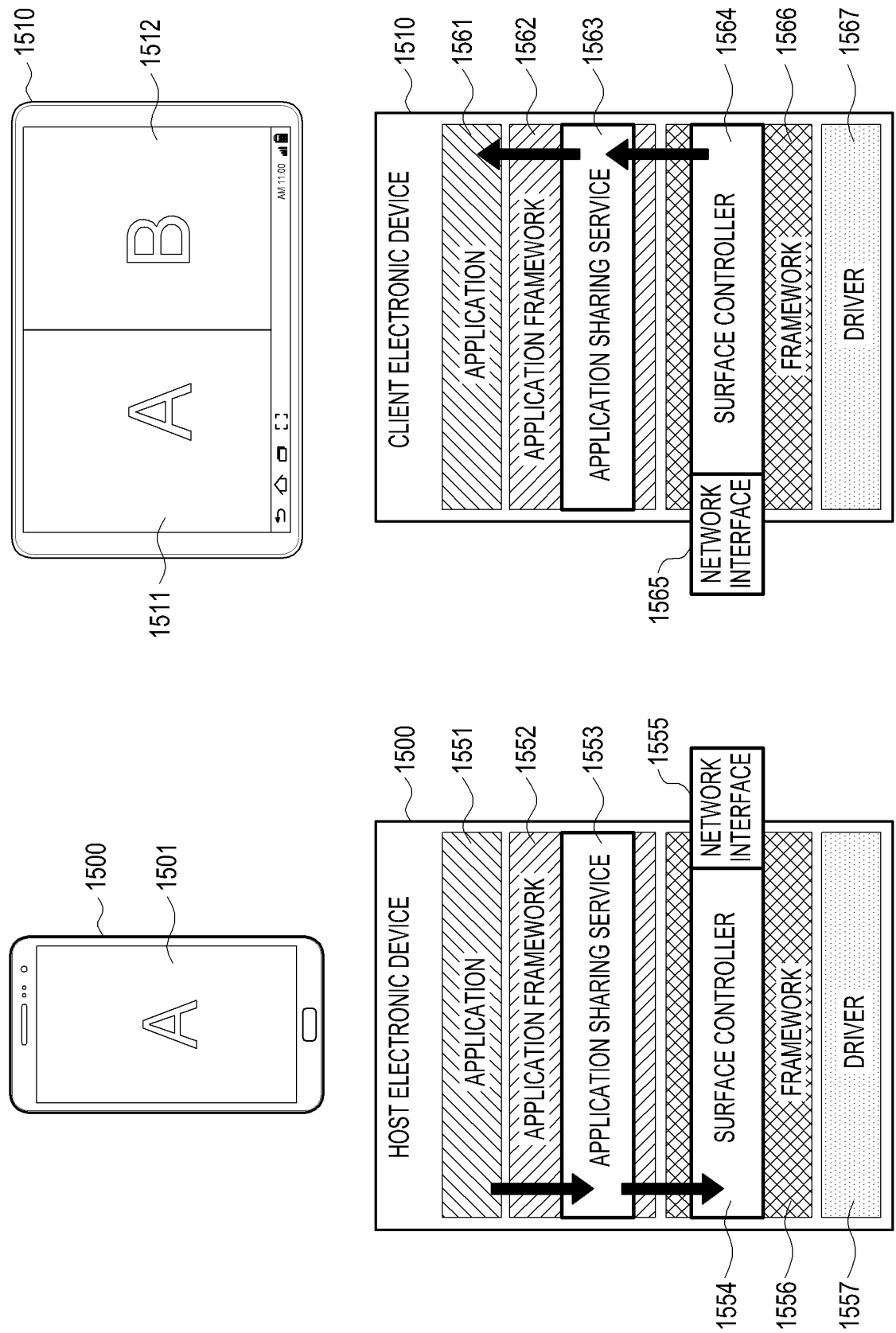
FIG. 15 illustrates layers in a host electronic device and a client electronic device according to an embodiment of the present disclosure.

FIG. 15 illustrates layers in a host electronic device and a client electronic device according to an embodiment of the present disclosure.

Referring to FIG. 15, a host electronic device 1500 may execute and display a first application execution screen 1501. The host electronic device 1500 may define an application layer 1551, an application framework layer 1552, an application sharing service layer 1553, a surface controller layer 1554, a network interface 1555, a framework layer 1556, and a driver 1557. For example, the first application A may be executed in the application layer 1551. The application framework layer 1552 may be an interface of the application layer 1551. The application sharing service layer 1553 may receive, for example, data of the first application A interfaced through the application framework layer 1552.

The application sharing service layer 1553 may allow the framework 1556 to transmit a surface of the corresponding application to the surface controller 1554 as the shared data. The network interface 1555 may transmit the surface of the corresponding application to a network interface 1565 of the client electronic device 1510. The framework 1556 may provide the API or callback and the driver 1557 may control hardware.

The network interface 1565 of the client electronic device 1510 may receive, for example, a surface of the first application A as the shared data shown on application execution screen 1511, adjacent to screen 1512. The surface controller 1564 of the framework 1566 may process contents of the received surface and transmit the processed surface to the application sharing service layer 1563. The application sharing service layer 1563 transmits the received surface to the application framework layer 1562 to output the surface by using an application, such as a viewer only for the shared data. The application framework layer 1562 transmits the received surface to an application 1561, such as a viewer only for the shared data, to output the surface. The application, such as the viewer only for the shared data, receives an event from the user and transmits the event to the application framework layer 1562. The application framework layer 1562 may transmit the input event to the application sharing service layer 1563 and the application sharing service layer 1563 may transmit the event to the host electronic device 1500 through the network interface 1565. The framework layer 1566 may provide the API or callback and the driver 1567 may control hardware.

Figure 16:
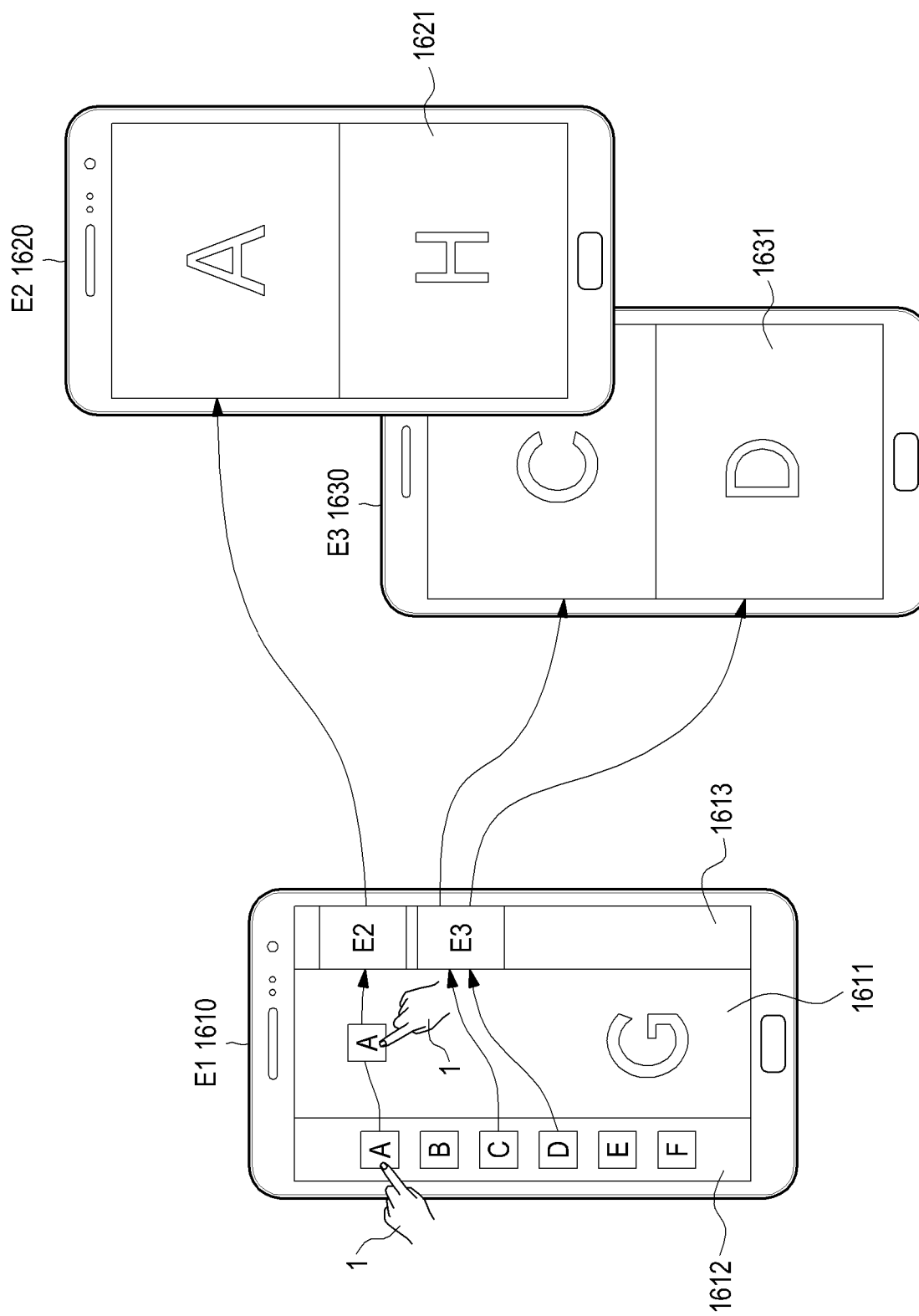
FIG. 16 illustrates a method in which a host electronic device and a client electronic device share shared data according to an embodiment of the present disclosure.

FIG. 16 illustrates a method in which a host electronic device and a client electronic device share shared data according to an embodiment of the present disclosure.

Referring to FIG. 16, a first electronic device E1 1610 is connected with a second electronic device E2 1620 and a third electronic device E3 1630. In an embodiment, it is assumed that the first electronic device 1610 is the host electronic device and the second electronic device 1620 and the third electronic device 1630 are the client electronic devices with respect to the first electronic device 1610.

Referring to FIG. 16, an execution screen of an application G currently executed by the first electronic device 1610 is displayed on a screen 1611 of the first electronic device 1610. The screen 1611 may display a list 1612 of applications A, B, C, D, E, and F which can be executed by the first electronic device 1610 on a left side of the screen 1611 and a list 1613 of the electronic devices E2 and E3 connected with the first electronic device 1610 on a right side of the screen 1611. The user 1 using the first electronic device 1610 may select one of the applications A, B, C, D, E, and F included in the list 1612 and make a drag input of dragging the selected application to the electronic devices E2 and E3 included in the list 1613, in the first electronic device 1610, so as to share the applications A, B, C, D, E, and F with other electronic devices E2 and E3.

Referring to FIG. 16, the user 1 selects the application A from the list 1612 and drags the application A to the second electronic device E2, and selects the applications C and D and drags the applications C and D to the third electronic device E3. Further, it is assumed that the second electronic device 1620 is executing an application H. The second electronic device 1620 shares the application A with the first electronic device 1610 while executing the application H. Accordingly, an execution screen of the application A and an execution screen of the application H may be displayed on a screen 1621 of the second electronic device 1620. Further, execution screens of the applications C and D may be displayed on a screen 1631 of the third electronic device 1630 sharing the applications C and D with the first electronic device 1610.

According to another embodiment, a shared application may be an application which is not being executed by the first electronic device 1610. That is, in an embodiment, the first electronic device 1610 may control the second electronic device 1620 or the third electronic device 1630 such that the second electronic device 1620 or the third electronic device 1630 executes an application which is not being executed in the first electronic device 1610 according to a drag input.

Figure 17:
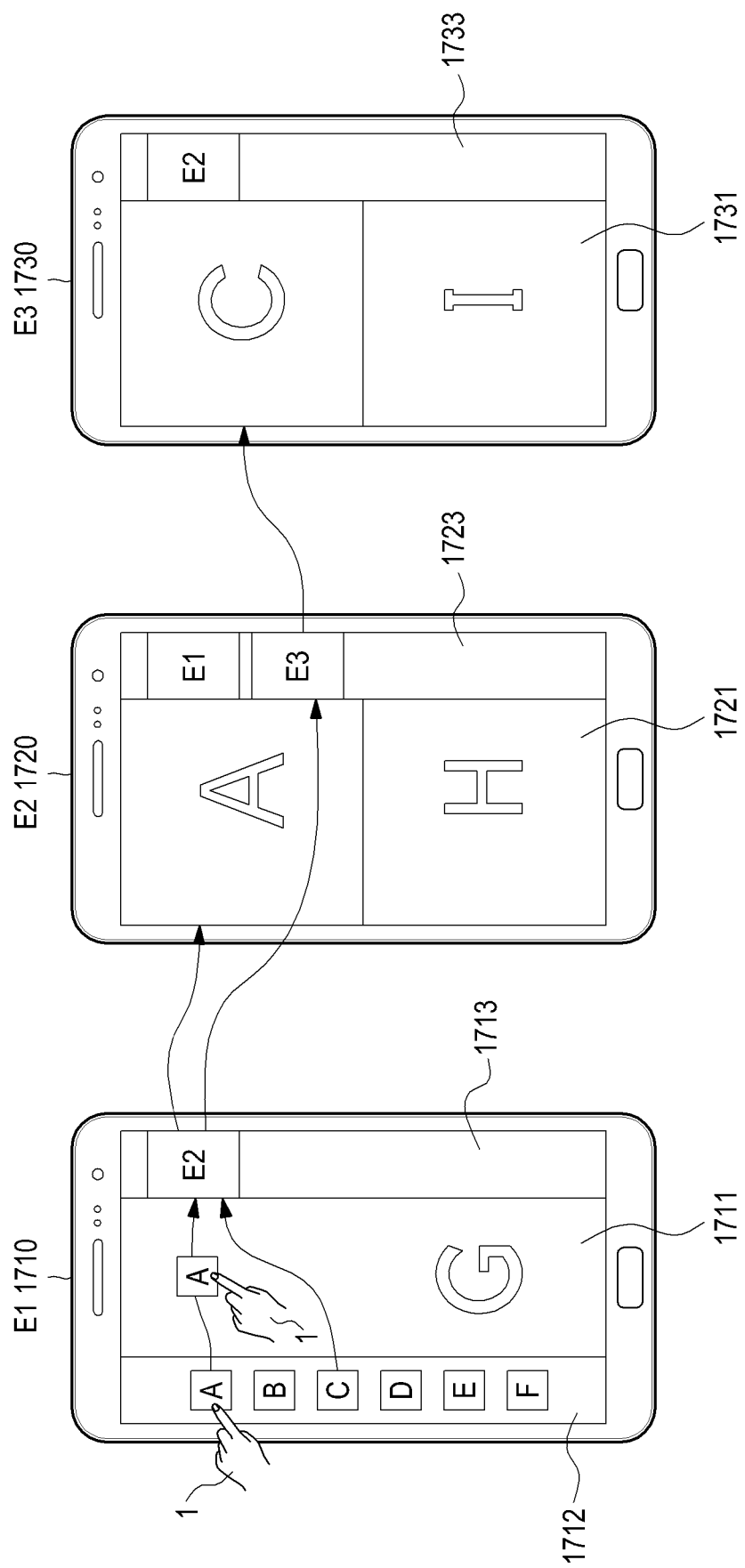
FIG. 17 illustrates a method in which a host electronic device and a client electronic device share shared data according to an embodiment of the present disclosure.

FIG. 17 illustrates a method in which a host electronic device and a client electronic device share shared data according to an embodiment of the present disclosure.

Referring to FIG. 17, a first electronic device E1 1710 is connected with a second electronic device E2 1720, the second electronic device E2 1720 is connected with the first electronic device E1 1710 and a third electronic device E3 1730, and the third electronic device E3 1730 is connected with the second electronic device E2 1720. In an embodiment, it is assumed that the first electronic device 1710 and the second electronic device are the host electronic devices, the second electronic device 1720 is the client electronic device of the first electronic device 1710 and the host electronic device of the third electronic device 1730, and the third electronic device 1730 is the client electronic device of the second electronic device 1720.

Referring to FIG. 17, the execution screen of the application G currently executed by the first electronic device 1710 is displayed on a screen 1711 of the first electronic device 1710. The screen 1711 may display a list 1710 of applications A, B, C, D, E, and F which can be executed by the first electronic device 1712 on a left side of the screen 1711 and a list 1713 of the electronic device E2 connected with the first electronic device 1710 on a right side of the screen 1711. Also, the second electronic device 1720 may display a list 1723 of the electronic devices E1 and E3 connected with the second electronic device 1720 on a right side of a screen 1721. Similarly, the third electronic device 1730 may display a list 1733 of the electronic device E2 connected with the third electronic device 1730 on a right side of a screen 1731.

In various embodiments, the user 1 using the first electronic device 1710 may select one of the applications A, B, C, D, E, and F included in the list 1712 and make a drag input of dragging the selected application to the electronic device E2 included in the list 1713, in the first electronic device 1713, so as to share the applications A, B, C, D, E, and F with another electronic device E2.

Referring to FIG. 17, the user 1 selects the application A from the list 1712 and drags the application A to the second electronic device 1720. At this time, it is assumed that the second electronic device 1720 is executing the application H. The second electronic device 1720 shares the application A with the first electronic device 1710 while executing the application H. Accordingly, the execution screen of the application A and the execution screen of the application H may be displayed on the screen 1721 of the second electronic device 1720.

The user 1 using the first electronic device 1710 may select the application C from the list 1712 and drag the application C to the third electronic device E3 connected with the second electronic device 1720. At this time, it is assumed that the third electronic device 1730 is executing an application I. The drag input by the user having selected the application C may be transferred to the second electronic device 1720 connected with the first electronic device 1710. The second electronic device 1720 may allow the third electronic device 1730 to execute the application C by controlling the third electronic device 1730 in accordance with the drag input. Accordingly, execution screens of the applications C and I may be displayed on a screen 1731 of the third electronic device 1730.

Figure 18:
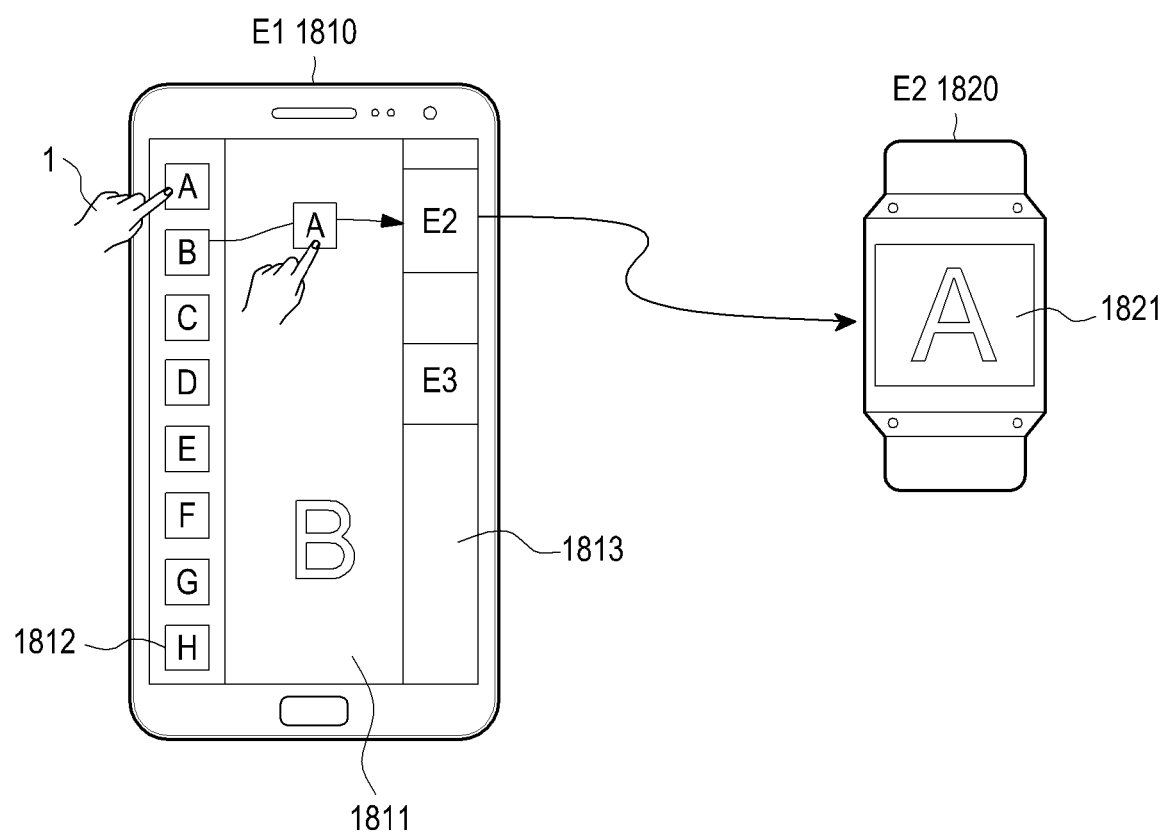
FIG. 18 illustrates a method in which a host electronic device and a client electronic device share shared data according to an embodiment of the present disclosure.

FIG. 18 illustrates a method in which a host electronic device and an accessory device share shared data according to an embodiment of the present disclosure.

Referring to FIG. 18, it is assumed that a first electronic device E1 1810 is the host electronic device of a second electronic device E2 1820 and the second electronic device 1820 is the client electronic device of the first electronic device 1810. Further, in FIG. 18, the client electronic device, that is, the second electronic device 1820 may be an accessory device of the host electronic device.

Referring to FIG. 18, the execution screen of the application B currently executed by the first electronic device 1810 is displayed on a screen 1811 of the first electronic device 1810. The screen 1811 may display a list 1812 of applications A, B, C, D, E, F, G, and H which can be executed by the first electronic device 1810 on a left side of the screen 1811 and a list 1813 of the electronic devices E2 and E3 connected with the first electronic device 1810 on a right side of the screen 1811.

Referring to FIG. 18, the first electronic device 1810 may be connected with accessory devices as the client electronic devices, for example, devices which can be attached to/detached from the host electronic device or can communicate with the host electronic device. The accessory devices may be, for example, display devices such as a TeleVision (TV) and a monitor, a digital clock and the like. In various embodiments, the host electronic device, for example, the first electronic device 1810 may perform a discovery operation to detect devices which are located close to the first electronic device 1810 and can communicate with the first electronic device 1810. The first electronic device 1810 may inform the user 1 of the accessory devices (for example, the display device and the like) detected through the discovery operation and receive a user input for determining whether to connect the first electronic device 1810 with the accessory devices. In an embodiment, the accessory devices refers to devices which can operate as the client electronic device. When the first electronic device 1810 receives the user input for determining to connect the first electronic device 1810 with the accessory devices, the first electronic device 1810 determines the corresponding accessory device as the client electronic device. That is, the host electronic device may recognize the accessory device connected with the host electronic device as the client electronic device. At this time, the host electronic device may receive device information of the accessory device from the accessory device. Further, when the second electronic device 1820 corresponding to the client electronic device is connected with the first electronic device 1810, the second electronic device 1820 operates according to a control of the first electronic device 1810 corresponding to the host electronic device.

As described above, when the first electronic device 1810 is connected with the accessory device, for example, the second electronic device 1820, the second electronic device E2 1820 may be inserted into the list 1813 displayed on the screen 1811. Further, the user 1 according to an embodiment may determine the execution screen of the application A to be displayed on the screen 1821 of the accessory device, that is, the second electronic device 1820 through a drag input as illustrated in FIG. 18.

Referring to FIG. 18, the user 1 selects the application A from the list 1812 and makes a drag input of dragging the application A to the accessory device connected with the first electronic device 1810, that is, the second electronic device 1820, in the first electronic device 1810. The host electronic device according to an embodiment, that is, the first electronic device 1810 may generate shared data to be shared with the accessory device and transmit the shared data to the accessory device as illustrated in FIG. 18. In various embodiments, the host electronic device (for example, the first electronic device 1810) may receive device information of the accessory device from the accessory device (for example, the second electronic device 1820). Further, the host electronic device may generate shared data based on the device information and transmit the shared data to the accessory device, so as to share data with the accessory device. At this time, the device information of the accessory device may include an identification, display size information, resolution information, display information, and voice or vibration multimedia output related information of the accessory device.

The accessory device, for example, second electronic device 1820 shares the application A with the first electronic device 1810. In various embodiments, the second electronic device 1820 may receive the shared data, for example, the execution screen of the application A from the first electronic device 1810 and display the received execution screen on the screen 1821. In various embodiments, the execution screen of the application A may be data generated by the first electronic device 1810 based on the device information of the second electronic device 1820.

Further, the connection between the host electronic device and the client electronic device according to an embodiment can be made through a wired/wireless broad area communication scheme, such as a LAN, a Metropolitan Area Network (MAN), or a Wide Area Network (WAN), as well as a short distance communication scheme, such as NFC, WiFi Direct, Bluetooth, or InfraRed (IR) communication. In addition, the host electronic device or the client electronic device may display a list of connected electronic devices and provide the list to the user. In various embodiments, the host electronic device or the client electronic device may automatically search for connectable electronic devices and provide a result thereof to the user in a list form. The user according to an embodiment may select at least one electronic device included in the list to be connected with the corresponding electronic device. In various embodiments, the connection between the electronic devices may be made in a form of M:1 or M:N (N is a natural number).

Through various embodiments of the present disclosure, an electronic device which can share an application with another electronic device and a control method thereof can be provided. Accordingly, the user may control the electronic device such that the electronic device shares only an application to be shared, not the entirety of the display, with another device. Another electronic device may receive a predetermined command from the user and transmit the command to the electronic device as well as simply displaying the application. The electronic device may input the command received from another electronic device into the application to process the command. Accordingly, the electronic device can cooperate with another electronic device.

It will be appreciated that the various embodiments of the present disclosure may be implemented in a form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. The various embodiments of the present disclosure can be realized by a computer or a portable terminal including a controller and a memory, and it can be seen that the memory corresponds to an example of a machine-readable storage medium which is suitable for storing a program or programs including instructions by which the various embodiments of the present disclosure are realized. Accordingly, the present disclosure includes a program including a code for implementing the apparatus and method described in the appended claims of the specification and a machine (a computer or the like)-readable storage medium for storing the program.

Further, the electronic device can receive the program from a program providing apparatus connected to the device wirelessly or through a wire and store the received program. The program supply apparatus may include a program that includes instructions to execute the various embodiments of the present disclosure, a memory that stores information or the like required for the various embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for sharing data with a client device by a host device, the method comprising:
   forming, by using a processor of the host device, a connection with the client device;
   receiving, by a transceiver of the host device, device information of the client device from the client device;
   displaying, on a first display of the host device, a first portion of a first execution screen of a first application executed on the host device based on device information of the host device, wherein a second portion of the first execution screen is not displayed on the first display;
   displaying, on the first execution screen, a first object corresponding to the client device and a second object corresponding to the first application executed on the host device for sharing with the client device;
   receiving, by using the first display, a first input for dragging the second object toward the first object;
   based on receiving the first input, transmitting, by using the transceiver, first data of the first application executed on the host device for displaying the second portion with at least a part of the first portion of the first execution screen on the second display of the client device, to the client device, while continuing to display the first portion on the first display;
   receiving, by using the transceiver, information on a coordinate of a second input with respect to the second display from the client device, wherein the information on the coordinate of the second input is transmitted by the client device in response to the second input being detected on the second display;
   based on receiving the information on the coordinate of the second input, adjusting the information on the coordinate of the second input based on the device information of the client device and the device information of the host device and displaying, on the first display, an event based on the adjusted information on the coordinate of the second input; and
   transmitting, by using the transceiver, second data of the first application executed on the host device corresponding to the displayed event to the client device,
   wherein the device information of the client device includes display size information and display resolution information of the client device, and
   wherein the device information of the host device includes display size information and display resolution information of the host device.

2. The method of claim 1, further comprising:
   transmitting, by using the transceiver, an application sharing request to the client device.

3. The method of claim 1, wherein the forming of the connection with the client device comprises:
   receiving, by using the transceiver, an application sharing request from the client device; and
   transmitting, by using the transceiver, an application sharing permission to the client device.

4. The method of claim 1, wherein the forming of the connection with the client device comprises:
   if an accessory device is detected, determining, by using the processor, the accessory device as the client device.

5. The method of claim 1, wherein the device information of the client device includes at least one of an identification of the client device, display information, or voice or vibration multimedia output related information.

6. The method of claim 1, further comprising:
   determining a preset application by default as the first application.

7. The method of claim 1, further comprising:
   displaying, by using the processor, the first execution screen and a second execution screen of a second application;
   detecting a fling of an execution screen between the first execution screen or the second execution screen; and
   generating, by using the processor, shared data including data in which the execution screen have been subjected to the fling.

8. The method of claim 7, further comprising:
   generating, by using the processor, the shared data by controlling internal information of the data in which the execution screen have been subjected to the fling based on the device information of the client device and the device information of the host device.

9. The method of claim 1, further comprising:
   generating, by using the processor, control information for allowing the first application to be executed on the client device.

10. The method of claim 1, further comprising receiving, by an input device of the host device, user command information related to a user command for the client device.

11. A host device for sharing data with a client device, the host device comprising:
    a first display;
    a transceiver; and
    a processor is configured to:
    control the transceiver to form a connection with the client device,
    receive, by using the transceiver, device information of the client device from the client device,
    control the first display to display a first portion of a first execution screen of a first application executed on the host device based on device information of the host device, wherein a second portion of the first execution screen is not displayed on the first display,
    control the first display to display, on the first execution screen, a first object corresponding to the client device and a second object corresponding to the first application executed on the host device for sharing with the client device, receive, by using the first display, a first input for dragging the second object toward the first object, based on receiving the first input, control the transceiver to transmit first data of the first application executed on the host device for displaying the second portion with at least a part of the first portion of the first execution screen on the second display of the client device, to the client device, while continuing to display the first portion on the first display, receive, by using the transceiver, information on a coordinate of a second input with respect to the second display from the client device, wherein the information on the coordinate of the second input is transmitted by the client device in response to the second input being detected on the second display, based on receiving the information on the coordinate of the second input, adjust the information on the coordinate of the second input based on the device information of the client device and the device information of the host device and control the first display to display an event based on the adjusted information on the coordinate of the second input, and control the transceiver to transmit second data of the first application executed on the host device corresponding to the displayed event to the client device, wherein the device information of the client device includes display size information and display resolution information of the client device, and wherein the device information of the host device includes display size information and display resolution information of the host device.

12. The host device of claim 11, wherein the processor is further configured to:

control the transceiver to transmit an application sharing request to the client device.

13. The host device of claim 11, wherein the processor is further configured to:

receive, by using transceiver, an application sharing request from the client device, and control the transceiver to transmit an application sharing permission to the client device.

14. The host device of claim 11, wherein the processor is further configured to:

detect an accessory device through a discovery operation, and determine the accessory device as the client device.

15. The host device of claim 11, wherein the device information of the client device includes at least one of an identification of the client device, display information, or voice or vibration multimedia output related information.

16. The host device of claim 11, wherein the processor is further configured to determine a preset application by default as the first application.

17. The host device of claim 11, wherein the processor is further configured to:

control the first display to display the first execution screen and a second execution screen of a second application, detect a fling of an execution screen between the first execution screen or the second execution screen, and generate shared data including data in which the execution screen have been subjected to the fling.

18. The host device of claim 17, wherein the processor is further configured to:

generate the shared data by controlling internal information of the data in which the execution screen have been subjected to the fling based on the device information of the client device and the device information of the host device.

19. The host device of claim 11, further comprising an input device, wherein the processor is further configured to:

receive, by using the input device, user command information related to a user command for the client device.

* * * * *